(12) United States Patent
Kawase et al.

(10) Patent No.: US 7,764,420 B2
(45) Date of Patent: Jul. 27, 2010

(54) DISPLAY DEVICE, METHOD OF MANUFACTURING DISPLAY DEVICE AND ELECTRONIC APPARATUS

(75) Inventors: Takeo Kawase, Suwa (JP); Harunobu Komatsu, Matsumoto (JP); Hitoshi Yamamoto, Chino (JP); Akira Matsumoto, Nagano (JP); Mitsuo Kushino, Osaka (JP); Tomoyuki Kuwamoto, Osaka (JP); Teruki Matsushita, Osaka (JP)

(73) Assignees: Seiko Epson Corporation, Tokyo (JP); Nippon Shokubai Co., Ltd., Osaka-shi (JP)

( * ) Notice: Subject to any disclaimer, the term of this patent is extended or adjusted under 35 U.S.C. 154(b) by 0 days.

(21) Appl. No.: 12/292,321

(22) Filed: Nov. 17, 2008

(65) Prior Publication Data
US 2009/0128889 A1     May 21, 2009

(30) Foreign Application Priority Data
Nov. 19, 2007   (JP)   ............................. 2007-299709

(51) Int. Cl.
*G02B 26/00* (2006.01)
(52) U.S. Cl. .................................................... 359/296
(58) Field of Classification Search .................. 359/296
See application file for complete search history.

(56) References Cited

U.S. PATENT DOCUMENTS

2004/0125433 A1 * 7/2004 Matsuda et al. ............. 359/296

2008/0135097 A1   6/2008 Kikuchi et al.

FOREIGN PATENT DOCUMENTS

| GB | 1 313 412 | 4/1973 |
|----|-----------|--------|
| JP | B-50-015115 | 6/1975 |
| JP | B2-2551783 | 3/1989 |
| JP | 2006/278071 | 10/2006 |

* cited by examiner

*Primary Examiner*—Evelyn A. Lester
(74) *Attorney, Agent, or Firm*—Oliff & Berridge, PLC

(57) ABSTRACT

A display device capable of easily and reliably obtaining an intermediate tone and reliably maintaining individual colors including the intermediate tone even at stoppage of application of an electrical voltage, a manufacturing method of a display device capable of easily and reliably manufacturing the display device, and an electronic apparatus provided with the display device are provided. The display device has a display surface. The display device includes an adsorption particle-containing layer including a wall portion with an inner surface for defining a space, a plurality of electrically charged adsorption particles provided within the space in an adsorbed state that they are adsorbed to the inner surface of the wall portion, and a substantially transparent medium provided within the space, and a pair of electrodes that, when applied with an electrical voltage, generate electrical fields to act on the adsorption particles, wherein in the case where the electrical voltage is applied to between the electrodes, the adsorption particles are moved along the inner surface of the wall portion while maintaining the adsorbed state.

20 Claims, 10 Drawing Sheets

DISPLAY DEVICE, METHOD OF MANUFACTURING DISPLAY DEVICE AND ELECTRONIC APPARATUS

CROSS-REFERENCE TO RELATED APPLICATION

This application claims a priority to Japanese Patent Application No. 2007-299709 filed on Nov. 19, 2007 which is hereby expressly incorporated by reference herein in its entirety.

BACKGROUND

1. Technical Field

The present invention relates to a display device, a method of manufacturing a display device and an electronic apparatus, and more specifically relates to a display device, a method of manufacturing the display device and an electronic apparatus provided with the display device.

2. Related Art

It is generally known that, if electrical fields are allowed to act on a dispersion system in which fine particles are dispersed in a liquid, the fine particles move (or migrate) in the liquid by a Coulomb force (an electrostatic force). This phenomenon is referred to as electrophoresis. In recent years, an electrophoretic display device that displays desired information (images) using the electrophoresis draws attention as a new display device.

This electrophoretic display device enjoys reduced power consumption, because it has a display memory property with which a display content is maintained even at the time of stoppage of voltage application. In particular, since the electrophoretic display device performs its display operations using reflected light just like general printed matters, it has such features as a broad viewing angle property and a high-contrast display capability.

As one example of conventional electrophoretic display devices, JP-B-S50-15115 discloses an electrophoretic display device that makes use of an electrophoretic dispersion liquid prepared by dispersing two kinds of electrophoretic particles charged with opposite polarities to each other in a liquid phase dispersion medium.

Further, Japanese Patent No. 2551783 discloses an electrophoretic display device that makes use of microcapsules, each of which includes an electrophoretic dispersion liquid prepared by dispersing one kind of electrophoretic particles in a liquid phase dispersion medium, and a shell into which the electrophoretic dispersion liquid is encapsulated.

Furthermore, there has been proposed a combination of the two electrophoretic display devices disclosed in these patent documents, i.e., an electrophoretic display device that makes use of microcapsules, each of which includes an electrophoretic dispersion liquid prepared by dispersing electrophoretic particles for white color display (white particles) and electrophoretic particles for black color display (black particles) in a liquid phase dispersion medium, the white particles and the black particles being charged with opposite polarities to each other, and a shell into which the electrophoretic dispersion liquid is encapsulated.

In the conventional electrophoretic display devices, an absolute value of a net charge amount of an inner wall of a retention wall or a capsule (the shell) is smaller than an absolute value of a net charge amount of a surface of each of the electrophoretic particles, and charge polarities thereof are opposite to each other.

As a result, if electrical fields act on the electrophoretic particles, they are moved parallel to an application direction of the electrical fields toward an electrode having a charge polarity opposite to the charge polarity of the surfaces of the electrophoretic particles.

With the conventional electrophoretic display devices, a difference in electrophoretic mobility or the like between the electrophoretic particles (the white and black particles) is used in obtaining a gray color of specified gradation which is an intermediate tone (intermediate color) of white color and black color.

A specified magnitude of the electrical voltage is applied to between a pair of electrodes for a predetermined time in such a fashion that a perfectly white state is not changed to a perfectly black state or a perfectly black state is not changed to a perfectly white state.

This creates a state that the white particles and the black particles are dispersed or aggregated in a specific region in the liquid phase dispersion medium. Thus, the gray color is obtained at any rate. In the conventional electrophoretic display devices, however, it is difficult to obtain a specific intermediate tone of a gray color or other colors of specified gradation.

More specifically, if the electrical voltage is applied to a pair of electrodes in a perfectly white state or a perfectly black state, the white particles and the black particles are moved from one electrode to the other electrode in a liquid phase dispersion medium while colliding with each other.

Further, when the gray color is displayed, the white particles and the black particles exist in a mixed state. This leads to inferior reproducibility and makes it very difficult to obtain a gray color of specified gradation. Even if the gray color is obtained by stoppage of the application of the electrical voltage to the pair of electrodes, such a state is unstable and is changed over time.

In other words, since the white particles and the black particles are floating in the liquid phase dispersion medium, they are moved in the liquid phase dispersion medium over time. Furthermore, since the white particles and the black particles are electrically charged with the opposite polarities to each other, they are adsorbed together so that a plurality of the white and black particles are aggregated together.

For these reasons, even if the gray color of the specified gradation is obtained, the gray color cannot be maintained as it is and thus a displayed image becomes highly unstable.

Moreover, the mutually adsorbed white and black particles need to be separated prior to providing the next display. To this end, an electrical voltage having higher magnitude is repeatedly applied to between the pair of electrodes while alternately changing its polarity. Otherwise, an additional electrode needs to be provided for that purpose.

This makes a control operation and a structure of the conventional electrophoretic display device complicated, and leads to increased power consumption thereof. In addition, when switching the white color display and the black color display, the white particles and the black particles collide with each other. This leads to a shortcoming of reduced responsiveness of the conventional electrophoretic display device.

SUMMARY

It is an object of the present invention to provide a display device capable of easily and reliably obtaining an intermediate tone and reliably maintaining individual colors including the intermediate tone even at stoppage of application of an electrical voltage, a manufacturing method of a display device capable of easily and reliably manufacturing the display device, and an electronic apparatus provided with the display device.

As a result of keen examination, the present inventors have succeeded in finding out a method (an electro-crawling method) by which particles (the electrophoretic particles) are crawlingly moved along the inner wall of the retention wall or the capsule (the shell), as distinguished from the conventional electrophoresis method.

This phenomenon occurs if the absolute value of the net charge amount of the inner wall of the retention wall or the capsule is greater than the absolute value of the net charge amount of the surface of each of the particles, and the charge polarities thereof are opposite to each other. The electro-crawling method will be described later in more detail.

In a first aspect of the present invention, there is provided a display device, wherein the device has a display surface. The display device comprises an adsorption particle-containing layer including a wall portion with an inner surface for defining a space, a plurality of electrically charged adsorption particles provided within the space in an adsorbed state that they are adsorbed to the inner surface of the wall portion, and a substantially transparent medium provided within the space, and a pair of electrodes that, when applied with an electrical voltage, generate electrical fields to act on the adsorption particles, wherein in the case where the electrical voltage is applied to between the electrodes, the adsorption particles are moved along the inner surface of the wall portion while maintaining the adsorbed state.

This ensures that the adsorption particles (display particles) are always adsorbed to any region on the inner surface of the wall portion (e.g., a shell of a microcapsule). As a result, the adsorption particles are reliably moved along the inner surface thereof while maintaining the absorbed state. Further, no particle (obstacle) other than the adsorption particles is present within the space. Therefore, it is possible to easily and reliably obtain an intermediate tone.

In addition, since the adsorption particles are adsorbed to the inner surface of the wall portion even at stoppage of the application of the electrical voltage to between the electrodes, it is possible to reliably maintain individual colors including the intermediate tone. In other words, display is highly stable and, even when the application of the electrical voltage is stopped after a specified display content (an image) has been displayed, the display content is maintained stably (namely, it is possible to prevent deterioration of a display state).

Further, the adsorption particles are adsorbed to the inner surface of the wall portion so that they are hard to adhere to each other. This assists in increasing display contrast and chromatic purity. Furthermore, it is possible to reliably move the adsorption particles with relatively weak electrical fields, thereby reducing power consumption of the display device.

In the display device according to the present invention, it is preferred that the adsorption particles are adsorbed to the inner surface of the wall portion due to an electrostatic force therebetween.

This makes it possible to adsorb the adsorption particles to the inner surface of the wall portion easily and reliably.

In the display device according to the present invention, it is preferred that the adsorption particles and the wall portion are electrically charged with opposite polarities to each other so that the adsorption particles are adsorbed to the inner surface of the wall portion due to the opposite polarities thereof.

This makes it possible to adsorb the adsorption particles to the inner surface of the wall portion easily and reliably.

In the display device according to the present invention, it is preferred that an attractive force due to an interaction between the adsorption particles and the wall portion including the electrostatic force therebetween is greater than an electrostatic force acting on the adsorption particles due to the electrical fields generated between the electrodes.

This makes it possible to prevent the adsorption particles from moving away from the wall portion, which ensures that they are reliably moved along the inner surface of the wall portion while maintaining the adsorbed state.

In the display device according to the present invention, it is preferred that the transparent medium comprises a liquid or a gas filled in the space.

Inasmuch as no obstacle other than the adsorption particles is present within the space, the adsorption particles can move easily and reliably. This enhances responsiveness in display.

In the display device according to the present invention, it is preferred that the adsorption particles comprise colored particles.

This makes it possible to obtain more excellent display performance of the display device.

In the display device according to the present invention, it is preferred that the electrodes are provided in a mutually facing relationship through the adsorption particle-containing layer, and the inner surface of the wall portion has a curved concave surface extending between the electrodes.

This makes it possible for the adsorption particles to smoothly and reliably move along the curved concave surface of the wall portion. Therefore, it is possible to obtain an intermediate tone more easily and reliably.

In the display device according to the present invention, it is preferred that the space is defined into a spherical shape or an ellipsoidal shape by means of the wall portion.

This makes it possible for the adsorption particles to smoothly and reliably move along the inner surface of the wall portion. Therefore, it is possible to obtain an intermediate tone more easily and reliably.

In the display device according to the present invention, it is preferred that the wall portion is formed of a shell, and the adsorption particles and the transparent medium are encapsulated into the shell to form a microcapsule.

In this case, the display device can be manufactured more easily and reliably than what is called a microcup type display device.

In the display device according to the present invention, it is preferred that the shell comprises a first layer and a second layer arranged outside the first layer, the first layer and the second layer each having a shell-like shape.

This makes it possible to manufacture the display device easily.

It is preferred that the display device according to the present invention further comprises a reflector that diffusely reflects light and provided on an opposite side of the adsorption particle-containing layer from the display surface.

In this case, it becomes possible to provide, e.g., white and black display or color display.

In the display device according to the present invention, it is preferred that the reflector includes a plurality of particles capable of scattering light.

This makes it possible to improve efficiency with which incident light is used.

In the display device according to the present invention, it is preferred that by selecting one of different patterns of applying the electrical voltage to between the electrodes, the adsorption particles are moved so as to change a state that a portion of the reflector lying just below the space surrounded by the wall portion as viewed from the display surface is covered with the adsorption particles into a state that the portion of the reflector is not covered with the adsorption particles and vice versa.

This makes it possible to display individual colors more easily and reliably.

In the display device according to the present invention, it is preferred that by selecting one of different patterns of applying the electrical voltage to between the electrodes, an area of a region covered with the adsorption particles in the portion of the reflector lying just below the space surrounded by the wall portion as viewed from the display surface is adjustable.

This makes it possible to obtain an intermediate tone more easily and reliably.

It is preferred that the display device according to the present invention further comprises a color filter provided between the adsorption particle-containing layer and the reflector.

In this case, it becomes possible to provide, e.g., color display.

In a second aspect of the present invention, there is provided a method of manufacturing a display device. The method comprises a microcapsule-containing layer formation step for forming a microcapsule-containing layer including microcapsules each having an outer surface, the microcapsules each produced by encapsulating a plurality of electrically charged adsorption particles and a substantially transparent medium into a shell having an inner portion with an inner surface opposite from the outer surface, and an electrode formation step for forming a pair of electrodes that, when applied with an electrical voltage, generate electrical fields to act on the adsorption particles, wherein the microcapsule-containing layer formation step comprises a charging step for electrically charging the shell with an opposite polarity to the adsorption particles after forming the inner portion or the entirety of the shell, so that the adsorption particles are adsorbed to the inner surface of the shell.

This makes it possible to manufacture the above display device easily and reliably.

In the method according to the present invention, it is preferred that the shell comprises a first layer corresponding to the inner portion and a second layer arranged outside the first layer, the first layer and the second layer each having a shell-like shape, and the charging step is performed when forming the second layer.

This makes it possible to manufacture the above display device more easily and reliably.

In the method according to the present invention, it is preferred that in the microcapsule-containing layer formation step, the microcapsule-containing layer is formed using a microcapsule dispersion liquid prepared by mixing the microcapsules with a fixing material that makes close contact with the outer surface of each of the microcapsules to fix the microcapsules in place, and the charging step is performed when preparing the microcapsule dispersion liquid.

This makes it possible to manufacture the above display device more easily and reliably.

In a third aspect of the present invention, there is provided an electronic apparatus provided with the above display device.

This makes it possible to provide an electronic apparatus with excellent display performance.

DESCRIPTION OF EXEMPLARY EMBODIMENTS

Hereinafter, a display device, a method of manufacturing a display device and an electronic apparatus in accordance with the present invention will be described in detail with reference to preferred embodiments shown in the accompanying drawings.

First Embodiment

1. Display Device

First, description will be made on the display device according to the present invention.

Figure 1:
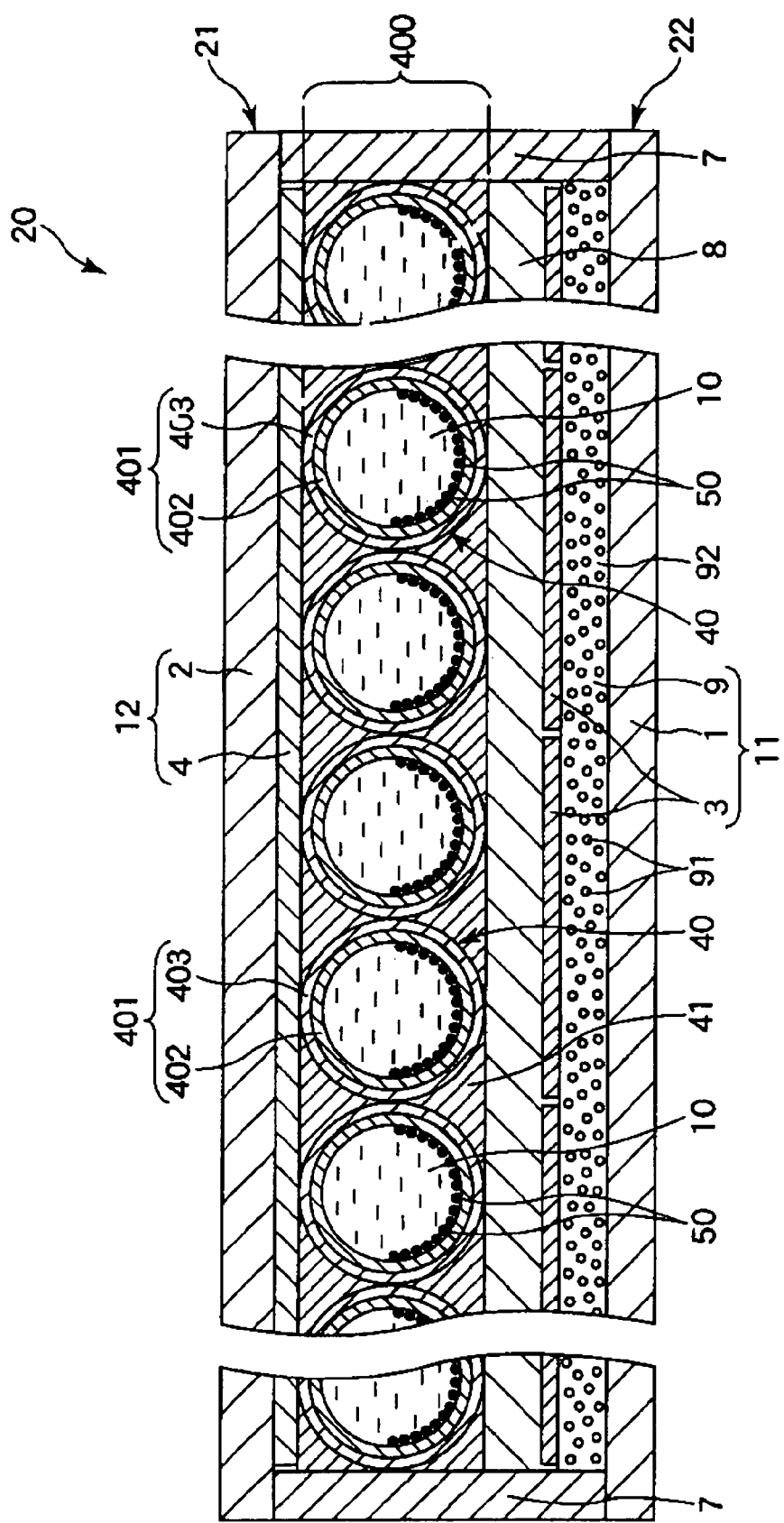
FIG. 1 is a vertical section view schematically showing a first embodiment of a display device according to the present invention.

FIG. 1 is a vertical section view schematically showing a first embodiment of the display device according to the present invention. FIGS. 2, 3A to 3C and 4 are pattern diagrams for explaining behavior of the display device shown in FIG. 1.

Figure 5:
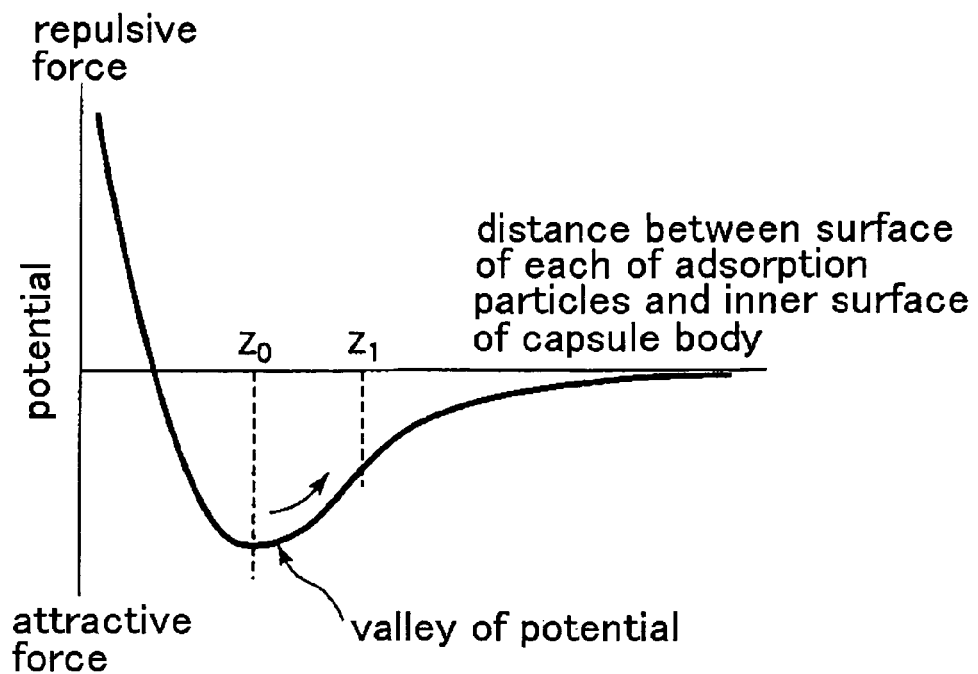
FIG. 5 is a graph (a potential curve) showing a relationship of a distance between a surface of each of adsorption particles and an inner surface of a capsule body to potential of the adsorption particle in the display device shown in FIG. 1.

FIG. 5 is a graph (a potential curve) showing a relationship of a distance between a surface of each of adsorption particles and an inner surface of a capsule body to potential of the adsorption particle in the display device shown in FIG. 1.

Figure 6:
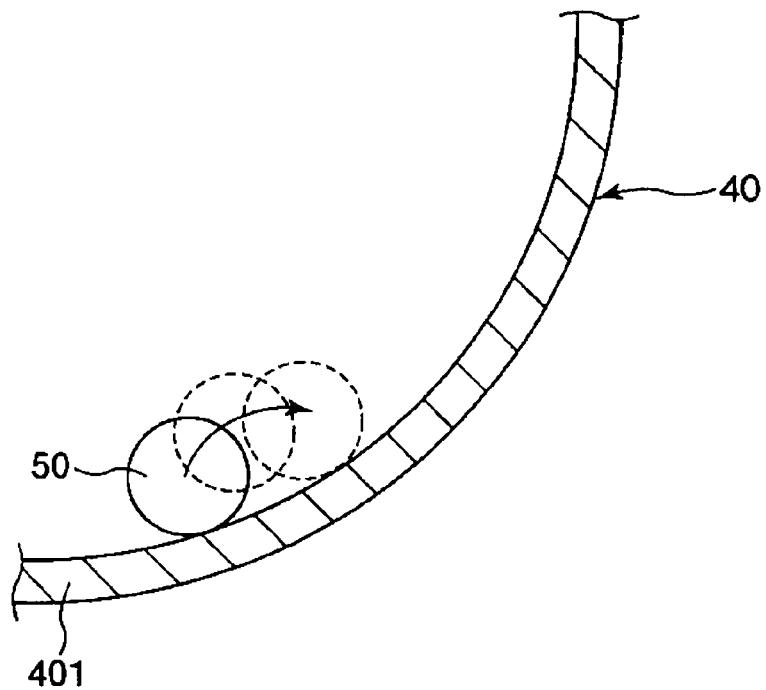
FIG. 6 is a pattern diagram for explaining behavior of the display device shown in FIG. 1.

FIG. 6 is a pattern diagram for explaining behavior of the display device shown in FIG. 1. FIGS. 7A to 7D and 8E to 8G are pattern diagrams for explaining a method of manufacturing the display device shown in FIG. 1.

Hereinafter, the upper side in each of FIGS. 1, 2, 3A to 3C, 4, 6, 7A to 7D and 8E to 8G will be referred to as "upper" and the lower side will be referred to as "lower" for the purpose of convenience in description. Further, in each of FIGS. 2, 3A to 3C, 4 and 6, a construction of a capsule body 41 is simplified so that the construction thereof is shown as a single layer construction.

As shown in FIG. 1, the display device 20 includes a display sheet (a front plane) 21, a circuit board (a back plane) 22, an adhesive agent layer 8 for bonding the display sheet 21 and the circuit board 22 together, and a sealing part 7 for air-tightly sealing a gap between the display sheet 21 and the circuit board 22.

The display sheet 21 includes a base substrate 12, which has a plate-like base portion 2 and a second electrode 4 formed on a lower surface of the base portion 2, and a microcapsule-containing layer (an adsorption particle-containing layer) 400 arranged on a lower surface (one major surface) of the base substrate 12 (the second electrode 4) and comprised of a plurality of microcapsules 40 and a binder 41.

On the other hand, the circuit board 22 includes an opposite substrate 11, which has a plate-like base portion 1, a plate-like reflector 9 provided on an upper surface of the base portion 1, and a plurality of first electrodes 3 formed on an upper surface of the reflector 9, and circuits (not shown) provided in the opposite substrate 11 (on the base portion 1), the circuits including switching elements such as TFTs and the like.

A construction of the respective parts will be now described one after another.

The base portions 1 and 2 are formed from a sheet-like (plate-like) member and have a function of supporting or protecting the respective members arranged therebetween.

Although the base portions 1 and 2 may be either flexible or rigid, it is preferred that the base portions 1 and 2 have flexibility. Use of the base portions 1 and 2 having flexibility makes it possible to provide a flexible display device 20, namely, a display device 20 useful in constructing, e.g., an electronic paper.

In the case where the base portions (base material layers) 1 and 2 are flexible, examples of a constituent material of each of them include polyolefin such as polyethylene, modified polyolefin, polyamide, thermoplastic polyimide, polyether, polyether ether ketone, various kinds of thermoplastic elastomers such as polyurethane-based elastomer and chlorinated polyethylene-based elastomer, copolymers mainly constituted of the above materials, blends mainly constituted of the above materials, polymer alloys mainly constituted of the above materials, and the like. One or more of these materials may be used independently or in combination.

An average thickness of each of the base portions 1 and 2 is not particularly limited to a specific value, but may be arbitrarily set depending on the constituent material and use thereof.

In the case where the base portions 1 and 2 are flexible, the average thickness of each of the base portions 1 and 2 is preferably in the range of about 20 to 500 μm, and more preferably in the range of about 25 to 250 μm. This makes it possible to reduce the size (especially, the thickness) of the display device 20, while harmonizing flexibility and strength of the display device 20.

The first electrodes 3 and the second electrode 4 (a pair of electrodes) are of a layered shape (a film shape) and are respectively arranged on both sides of the microcapsule-containing layer 400. In other words, the first electrodes 3 and the second electrode 4 are provided in a mutually facing relationship through the microcapsule-containing layer 400.

In this embodiment, the first electrodes 3 are formed on the upper surface of the reflector 9 provided on the base portion 1 and the second electrode 4 is formed on the lower surface of the base portion 2.

If an electrical voltage is applied to between the first electrodes 3 and the second electrode 4, electrical fields are generated across them so that the electrical fields act on adsorption particles (display particles) 50, which will be described below, present in the microcapsule-containing layer 400.

In this embodiment, the second electrode 4 serves as a common electrode and the first electrodes 3 function as individual electrodes divided in a form of a matrix (pixel electrodes connected to the switching elements). A portion where the second electrode 4 is overlapped with one of the first electrodes 3 constitutes a unit pixel.

Just like the first electrodes 3, the second electrode 4 may be divided into a plurality of electrodes. Furthermore, the first electrodes 3 may be divided into a plurality of stripe-shaped electrodes and, similarly, the second electrode 4 may be divided into a plurality of stripe-shaped electrodes. In this case, the first electrodes 3 and the second electrode 4 may be arranged to intersect with each other.

A constituent material of each of the first electrodes 3 and the second electrode 4 is not particularly limited to a specific type as long as it is substantially conductive. Various kinds of conductive materials may be used as the constituent material of each of the first electrodes 3 and the second electrode 4.

Examples of such a conductive material include: a metallic material such as copper, aluminum or alloy containing these metals; a carbon-based material such as carbon black; an electronically conductive polymer material such as polyacetylene, polyfluorene or derivatives thereof; an ion-conductive polymer material produced by dispersing an ionic substance such as NaCl or $Cu(CF_3SO_3)_2$ in a matrix resin such as polyvinyl alcohol or polycarbonate; and a conductive oxide material such as indium oxide (IO); and the like. One or more of these materials may be used independently or in combination.

An average thickness of each of the first electrodes 3 and the second electrode 4 is not particularly limited to a specific value, but may be arbitrarily set depending on the constituent material and use thereof. The average thickness of each of the first electrodes 3 and the second electrode 4 is preferably in the range of about 0.05 to 10 μm, and more preferably in the range of about 0.05 to 5 μm.

Among the base portions 1 and 2 and the first electrodes 3 and the second electrode 4, the ones arranged on a display surface side (the base portion 2 and the second electrode 4 in this embodiment) and arranged on a side opposite from the display surface (the first electrodes 3 in this embodiment) are optically transparent, i.e., substantially transparent (clear and colorless, clear and colorful, or translucent).

This makes it possible to easily recognize, through visual observation, a status of the adsorption particles 50 described below, i.e., information (images) displayed by the display device 20.

The reflector 9 is provided on an opposite side of the microcapsule-containing layer 400 from the base substrate 12 (from the display surface), namely between the first electrodes 3 and the base portion 1. This makes it possible to shorten a distance between the first electrodes 3 and the second electrode 4 as compared to a case that the first electrodes 3 would be provided between the reflector 9 and the base portion 1. Therefore, it is possible to generate strong electrical fields and to allow them to act on the adsorption particles 50.

The reflector 9 serves to diffusely reflect light (incident light). In this embodiment, the reflector 9 is of a sheet-like shape (a plate-like shape) and is constructed from a light-transmitting solid phase medium 92 and a plurality of particles 91 capable of scattering the light embedded in the medium 92 (namely, a plurality of a particles 91 capable of scattering the light provided in a gap defined by the first electrodes 3, a part of the adhesive agent layer 8, the base portion 1 and the sealing part 7). The particles 92 are uniformly dispersed in the medium 92.

It is preferred that the particles 91 have a refraction index greater than that of the medium 92. This ensures that the light incident on the reflector 9 is scattered by the particles 91 and, therefore, diffusely reflected from the reflector 9.

The particles 91 are not particularly limited to a specific type, and may be any kind of particles insofar as they can scatter the light. Examples of the particles 91 include pigment particles, resin particles and composite particles thereof. Examples of pigments forming the pigment particles include white pigments such as titanium oxide, antimony oxide and the like. Among them, titanium oxide is preferably used.

A shape of the particles 91 is not particularly limited to a specific type, but may preferably be spherical. It is preferred that particles 91 each having a relatively small size are used. More specifically, an average particle size of the particles 91 is preferably in the range of about 10 to 500 nm, and more preferably in the range of about 20 to 300 nm.

Although the reflector 9 may be either flexible or rigid, it is preferred that the reflector 9 has flexibility. Use of the reflector 9 having flexibility makes it possible to provide a flexible display device 20, namely a display device 20 useful in constructing, e.g., an electronic paper.

A reflection plate (a second reflector) having an upper mirror surface not shown in the drawings may be provided on a lower surface of the reflector 9, i.e., between the reflector 9 and the base portion 1. This ensures that, even if a part of the incident light passes through the reflector 9, the reflection plate can reflect the same. Therefore, it is possible to improve efficiency with which the incident light is used.

The medium 92 of the reflector 9 is not limited to a solid phase one, but may be a liquid phase one. In the latter case, it is necessary to use, e.g., a housing for receiving the medium 92. It is preferred that specific gravity of the particles 92 is generally equal to that of the medium 92. This makes it possible to reliably obtain a state that the particles 91 are uniformly dispersed in the medium 92.

The reflector 9 is not limited to the one constructed as above, but may be any other type insofar as it has a function of diffusely reflecting the light. For example, a metal plate (a reflection plate) having fine surface irregularities (a coarse surface) may be used as the reflector 9.

The reflector 9 and the first electrodes 3 may have a positional relationship vertically inverted from the illustrated construction. In other words, the first electrodes 3 may be provided on the upper surface of the base portion 1, and the reflector 9 may be provided on the upper surfaces of the first electrodes 3. In this instance, the first electrodes 3 may be not transparent.

The reflector 9 may be constructed to have the same function as the base portion 1, i.e., the function of supporting and protecting the individual members. In this case, it may be possible to omit the base portion 1.

While the reflector 9 is continuously formed (or formed of a single body) in the illustrated construction, the present invention is not limited thereto. Alternatively, the reflector 9 may be formed of a plurality of unit reflectors. In this case, either one microcapsule 40 or a plurality of microcapsules 40 may be arranged in alignment with one unit reflector.

In the display sheet 21, the microcapsule-containing layer 400 is provided in contact with a lower surface of the second electrode 4. The microcapsule-containing layer 400 includes a plurality of microcapsules 40 and a binder (a fixing material) 41 for fixing (or holding) the microcapsules 40 in place, each of the microcapsules 40 having a capsule body (a shell) 401 and at least the adsorption particles 50 encapsulated into the capsule body 401.

Hereinafter, the microcapsule-containing layer 400 will be described, but the microcapsules 40 will be described below in detail.

The binder 41 makes close contact with an outer surface of each of the microcapsules 40 and covers each of the microcapsules 40. Gaps (interstices) formed between the microcapsules 40 are filled with the binder 41.

The binder 41 is provided between the opposite substrate 11 and the base substrate 12 for the purpose of, e.g., bonding the opposite substrate 11 and the base substrate 12 together, fixing the microcapsules 40 between the opposite substrate 11 and the base substrate 12, assuring insulation between the first electrodes 3 and the second electrode 4, and generating strong electrical fields by filling the gaps between the microcapsules 40 therewith. This makes it possible to further improve durability, reliability and display performance of the display device 20.

Preferably used as the binder 41 is a resin material that exhibits high affinity with (improved adhesion to) the respective electrodes 3 and 4 and the capsule bodies 401 (of the microcapsules 40) and has increased insulation performance and relatively high permittivity which does not allow a current to flow at all or allows a current to slightly flow.

Examples of such a resin material used as the binder 41 include: a thermoplastic resin such as polyethylene, polypropylene, ABS resin, methacrylate resin (e.g., methyl methacrylate resin), vinyl chloride resin or cellulose-based resin; silicone-based resin; urethane-based resin; and the like. One or more of these materials may be used independently or in combination.

In this embodiment, the display sheet 21 and the circuit board 22 are bonded together by means of the adhesive agent layer 8. This makes it possible to fix the display sheet 21 and the circuit board 22 in a reliable manner. It is preferred that the adhesive agent layer 8 is mainly constituted of polyurethane.

The polyurethane contains an isocyanate component and a polyol component. The isocyanate component may be, e.g., at least one kind of tetramethylxylene diisocyanate (TMXDI), hexamethylene diisocyanate (HMDI) and derivatives thereof. The polyol component may be, e.g., at least one kind of polypropylene glycol (PPG), polytetramethylene glycol (PTMG) and derivatives thereof.

The constituent material of the adhesive agent layer 8 is not limited: to the polyurethane. In addition to the polyurethane, examples of the constituent material of the adhesive agent layer 8 further include a resin material such as polyethylene, chlorinated polyethylene, ABS resin, vinyl acetate copolymer, fluorine-based resin or silicone-based resin, and the like. One or more of these materials may be used independently or in combination.

The sealing part 7 is provided between the base portions 1 and 2, and along peripheral edges of the first electrodes 3, the second electrode 4, the microcapsule-containing layer 400, the adhesive agent layer 8 and the reflector 9. The first electrodes 3, the second electrode 4, the microcapsule-containing layer 400, the adhesive agent layer 8 and the reflector 9 are air-tightly sealed by means of the sealing part 7.

This makes it possible to prevent moisture from infiltrating into the display device 20, thereby reliably avoiding degradation in display performance of the display device 20.

Various kinds of resin materials can be used as a constituent material of the sealing part 7. Examples of such resin materials include: a thermoplastic resin such as acryl-based resin, urethane-based resin or olefin-based resin; a thermosetting resin such as epoxy-based resin, melamine-based resin or phenol-based resin; and the like. One or more of these resin materials may be used independently or in combination.

In this regard, it is to be noted that the sealing part 7 may be either provided or removed depending on the circumstances.

The adsorption particles (electrically charged particles) 50 are adsorbed to an inner surface of the capsule body 401 of each of the microcapsules 40. In other words, the adsorption particles 50 are electrically charged with a specified polarity and the capsule body 401 is electrically charged with an opposite polarity to the adsorption particles 50 as will be set forth later.

Therefore, the adsorption particles 50 are adsorbed to the inner surface of the capsule body 401. Namely, the adsorption particles 50 are provided within a space defined by the inner surface of the capsule body 401 in an adsorbed state that they are adsorbed thereto.

The adsorption particles 50 may include one or more kinds of particles. It is preferred that colored particles are used as the adsorption particles 50. In this embodiment, back particles (black colored particles) for displaying a black color are used as the adsorption particles 50.

A liquid as a transparent medium which is substantially transparent, i.e., a liquid 10 containing no particle in this embodiment, is encapsulated (or filled) into the capsule body 401. In this regard, the term "substantially transparent" means that, when filled into the capsule body 401, the liquid 10 has visible light transmittance of 90% or more.

It may be possible to use, e.g., a liquid containing particles or a gas such as air or the like in place of the liquid 10. In the case of using the gas, a pressure within the capsule body 401 is not particularly limited to a specific value, but may be nearly vacuum (or substantially vacuum).

A task of dispersing the adsorption particles 50 in the liquid (a liquid-phase dispersion medium) 10 in producing the microcapsules 40 can be performed by using one or more of, e.g., a paint shaker method, a ball mill method, a media mill method, an ultrasonic dispersion method and a stirrer dispersion method.

A liquid that exhibits low solubility to the capsule body 401 and has relatively high insulation performance is preferably used as the liquid 10.

Examples of the liquid 10 include: waters such as distilled water and deionized water; alcohols such as methanol; cellosolves such as methyl cellosolve; esters such as methyl acetate; ketones such as acetone; aliphatic hydrocarbons (liquid paraffins) such as pentane; alicyclic hydrocarbons such as cyclohexane; aromatic hydrocarbons such as benzene; halogenated hydrocarbons such as methylene chloride; aromatic heterocycles such as pyridine; nitrites such as acetonitrile; amides such as N,N-dimethylformamide; carboxylic salts; oils such as silicone oil; and the like. One or more of them may be used independently or in combination.

Among them, it is preferable to use hydrocarbons each having a boiling point of 80° C. or higher or the silicone oil as the liquid 10.

Further, if necessary, various kinds of additives may be added to the liquid 10. Examples of such additives include: a charge-controlling agent formed of particles of an electrolyte, a (anionic or cationic) surfactant such as alkenylsuccinate, a metal soap, a resin material, a rubber material, an oil, a varnish or a compound; a dispersion agent such as a silane-based coupling agent; a lubricating agent; a stabilizing agent; and the like.

The adsorption particles 50 are charged particles capable of, under the action of the electrical fields, moving along the inner surface of the capsule body 401 in the liquid 10. In other words, the adsorption particles 50 are moved along the inner surface of the capsule body 401 while maintaining the adsorbed state as will be described later.

The adsorption particles 50 may be any kind of particles insofar as they have electrical charges. Although not particularly limited, at least one of pigment particles, resin particles and composite particles thereof may be preferably used as the adsorption particles 50. Use of these particles provides an advantage in that they are easy to produce, while assuring easier control of electrical charges.

Examples of a pigment of which the pigment particles are made include: a black pigment such as aniline black, carbon black or titanium black; a white pigment such as titanium oxide or antimony oxide; an azo-based pigment such as monoazo; a yellow pigment such as isoindolinone or chrome yellow; a red pigment such as quinacridone red or chrome vermilion; a blue pigment such as phthalocyanine blue or indanthrene blue; a green pigment such as phthalocyanine green; and the like. One or more of these pigments may be used independently or in combination.

Examples of a resin material of which the resin particles are made include acryl-based resin, urethane-based resin, urea-based resin, epoxy-based resin, polystyrene, polyester and the like. One or more of these resin materials may be used independently or in combination.

Examples of the composite particles include: particles produced by coating surfaces of the pigment particles with the resin material or other pigment; particles produced by coating surfaces of the resin particles with the pigment; and particles made of a mixture obtained by mixing the pigment and the resin material in a suitable composition ratio.

Examples of the particles produced by coating the surfaces of the pigment particles with the other pigment include particles obtained by coating surfaces of titanium oxide particles with silicon oxide or aluminum oxide. These particles are preferably used as adsorption particles 50 for displaying a white color.

Carbon black particles, titanium black particles or particles produced by coating surfaces of these particles with other material are preferably used as adsorption particles 50 for displaying a black color.

Further, a shape of the adsorption particles 50 is not particularly limited to a specific type, but may preferably be spherical. It is preferred that adsorption particles 50 each having a relatively small size are used. More specifically, an average particle size of the adsorption particles 50 is preferably in the range of about 10 nm to 3 µm, more preferably in the range of about 20 nm to 2 µm, and even more preferably in the range of about 20 nm to 800 nm.

As shown in FIG. 1, each of the microcapsules 40 has a size corresponding to a full thickness of the microcapsule-containing layer 400, and the microcapsules 40 are arranged lengthwise and crosswise between the opposite substrate 11 and the base substrate 12 so as to form a single layer (in which the microcapsules 40 are arranged side by side with no overlap in the thickness direction of the microcapsule-containing layer 400).

While two microcapsules 40 are aligned with one first electrode 3 in the illustrated construction, the present invention is not limited thereto. For example, one microcapsule or more than two microcapsules 40 may be aligned with one first electrode.

In the illustrated construction, the microcapsules 40 are kept in a generally spherical shape without being compressed (pressed) in an up-and-down direction, even if they are sandwichedly held by the second electrode 4 and the adhesive agent layer 8 in between the opposite substrate 11 and the base substrate 12. The capsule body (the shell) 401 serving as the wall portion (a wall structure) for defining a space filled with the liquid 10 (a space within which the transparent medium is provided) is formed into a spherical shell shape.

In other words, the inner surface of the capsule body 401 is formed of a curved concave surface extending (continuously extending) between the first electrodes 3 and the second electrode 4. This means that no planar surface extending parallel to the first electrodes 3 and the second electrode 4 exists in the inner surface of the capsule body 401. This makes it possible for the adsorption particles 50 to smoothly and reliably move along the inner surface (the curved concave surface) of the capsule body 401.

In this regard, it is to be noted that the microcapsules 40 are not limited to the spherical shape, but may be formed into, e.g., a generally elliptical shape or other shapes. In other words, the capsule body 401 is not limited to the spherical shape, but may be formed into, e.g., an elliptical shell shape or other shapes.

The capsule body 401 is electrically charged with an opposite polarity to the adsorption particles 50. Therefore, the adsorption particles 50 are adsorbed to the inner surface of the capsule body 401 by an attractive force due to an interaction between the adsorption particles 50 and the capsule body 401, which amounts to a sum (a resultant force) of an electrostatic force and a van der Waals force therebetween.

Figure 2:
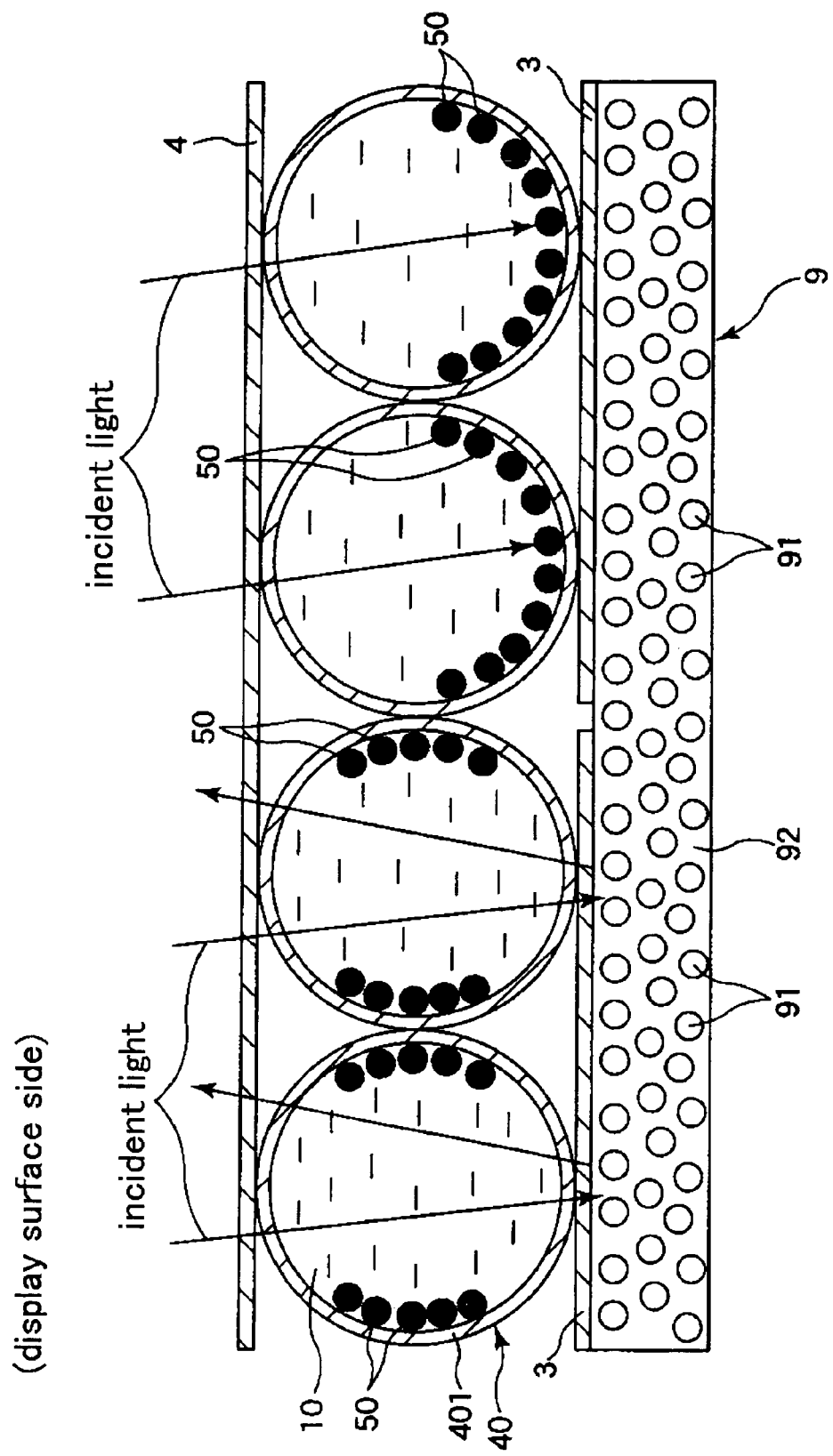
FIGS. 2, 3A to 3C and 4 are pattern diagrams for explaining behavior of the display device shown in FIG. 1.

Referring to FIG. 2, the adsorption particles 50 are adsorbed to the inner surface of the capsule body 401 and kept stationarily in a specified position when no electrical voltage is applied to between the first electrodes 3 and the second electrode 4.

If an electrical voltage is applied to between the first electrodes 3 and the second electrode 4 to generate electrical fields therebetween, the adsorption particles 50 are moved toward one of the electrodes 3 and 4 along the inner surface of the capsule body 401 under the action of the electrical fields while maintaining the adsorbed state.

Then, if the application of the electrical voltage is stopped, the adsorption particles 50 cease to move along the inner surface of the capsule body 401 and are stopped in a specified position while maintaining the adsorbed state.

More specifically, if the adsorption particles 50 are negatively charged, with the capsule body 401 being charged positively, and if an electrical voltage is applied to between the first electrodes 3 and the second electrode 4 so that the first electrodes 3 can be in a positive electrical potential with respect to the second electrode 4, the adsorption particles 50 are moved along the inner surface of the capsule body 401 toward the first electrodes 3 (toward the opposite side from the display surface of the display device 20) while maintaining the adsorbed state.

In contrast, if an electrical voltage is applied to between the first electrodes 3 and the second electrode 4 so that the first electrodes 3 can be in a negative electrical potential with respect to the second electrode 4, the adsorption particles 50 are moved along the inner surface of the capsule body 401 toward the second electrode 4 (toward the display surface of the display device 20) while maintaining the adsorbed state.

In this case, the position of the adsorption particles 50 can be adjusted by applying a pulsed voltage (a pulse voltage) to between the first electrodes 3 and the second electrode 4, namely by regulating one or both of magnitude (a voltage value) and a time (an application time) of the electrical voltage applied to between the first electrodes 3 and the second electrode 4.

In other words, it is possible to change a state that a portion of the reflector 9 lying just below the space surrounded by the capsule body 401 as viewed from the display surface side (from the upper side in FIG. 2) of the display device 20 is covered with the adsorption particles 50 (the right state in FIG. 2) to a state that the portion of the reflector 9 is not covered with the adsorption particles 50 (the left state in FIG. 2) and vice versa, by selecting one of different patterns of applying the electrical voltage to between the first electrodes 3 and the second electrode 4.

This makes it possible to provide white and black display in this embodiment. As set forth above, the adsorption particles 50 serve as a shutter for changing the microcapsules 40 from a light-transmitting state to a light-interrupting state and vice versa.

For example, the displayed color becomes black when the adsorption particles 50 are positioned near the first electrodes 3 as shown on the right side in FIG. 2, namely when the adsorption particles 50 are positioned in a lower hemisphere of the capsule body 401 (a hemisphere near the first electrodes 3) to fully cover the portion of the reflector 9 lying just below the space surrounded by the capsule body 401 as viewed from the display surface side of the display device 20.

In other words, almost all (most) of light incident on the microcapsules 40 is absorbed by the adsorption particles 50. Therefore, the display device 20 is seen black (the same color as the adsorption particles 50) when viewed from the display surface side thereof.

The displayed color becomes white when the adsorption particles 50 are medially positioned between the first electrodes 3 and the second electrode 4, namely when the adsorption particles 50 are distributed like a belt over upper and lower hemispheres of the capsule body 401 so as not to cover the portion of the reflector 9 lying just below the space surrounded by the capsule body 401 as viewed from the display surface side of the display device 20.

In other words, almost all (most) of the light incident on the microcapsules 40 passes through the microcapsules 40 and arrives at the reflector 9 where light is scattered by the particles 91. Consequently, the light is diffusely reflected from the reflector 9. Therefore, the display device 20 is seen white when viewed from the display surface side thereof.

An area of a region covered by the adsorption particles 50 in the portion of the reflector 9 lying just below the space surrounded by the capsule body 401 as viewed from the display surface side (the upper side in FIG. 2) of the display device 20, i.e., a ratio (S2/S1) of an area (S2) of the region covered by the adsorption particles 50 to a total area (S1) of the portion of the reflector 9 lying just below the space surrounded by the capsule body 401, can be adjusted by selecting one of different patterns of applying the electrical voltage to between the first electrodes 3 and the second electrode 4.

This makes it possible, in providing the white and black display in this embodiment, to display an arbitrary intermediate tone (an intermediate color) between the white color and the black color, i.e., a gray color of arbitrary gradation (brightness). In other words, it is possible to continuously change the displayed color between the white color and the black color.

In this embodiment, as set forth above, the black color is displayed by positioning the adsorption particles 50 near the first electrodes 3, and the white color is displayed by positioning the adsorption particles 50 between the first electrodes 3 and the second electrode 4.

However, the present invention is not limited thereto. Alternatively, the black color may be displayed by positioning the adsorption particles 50 near the second electrode 4, and the white color is displayed by positioning the adsorption particles 50 between the first electrodes 3 and the second electrode 4.

Although not shown in the drawings, the displayed color becomes black when the adsorption particles 50 are positioned near the second electrode 4, namely when the adsorption particles 50 are positioned in the upper hemisphere of the capsule body 401 (the hemisphere near the second electrode 4) to fully cover the portion of the reflector 9 lying just below the space surrounded by the capsule body 401 as viewed from the display surface side of the display device 20.

Although there is no particular limitation in controlling the display device 20, the display device 20 may be controlled in the following manner. For example, the state that the adsorption particles 50 are positioned near the first electrodes 3 or the second electrode 4, i.e., the state that the black color is displayed, is set as an initial state (a reference state). In order to display the white color or the specified intermediate tone, it is preferred that the display device 20 is first restored to the initial state, and then the pulse voltage is applied to between the first electrodes 3 and the second electrode 4.

The reason for this is that it is possible to reliably restore the display device 20 to the initial state by, e.g., applying an electrical voltage to between the first electrodes 3 and the second electrode 4 for a sufficient time (namely, there is no need to finely adjust magnitude and an application time of the electrical voltage which is applied to restore the display device 20 to the initial state), and that it is possible to reliably display the white color or the desired intermediate tone by applying the pulse voltage in the initial state.

As another control method, it may also be preferred that the display device 20 is constructed to apply a pulse voltage required in changing a current display state that the intermediate tone is displayed into a display state that the white color or the desired intermediate tone is to be displayed.

The reason for this is that the display device 20 is capable of reliably displaying the black color, the white color and the intermediate tone, and that the white color and the desired intermediate tone can be reliably displayed even if the current display state is not restored to the initial state but successively changed into a state that the white color or the desired intermediate tone is to be displayed.

Figure 3A:
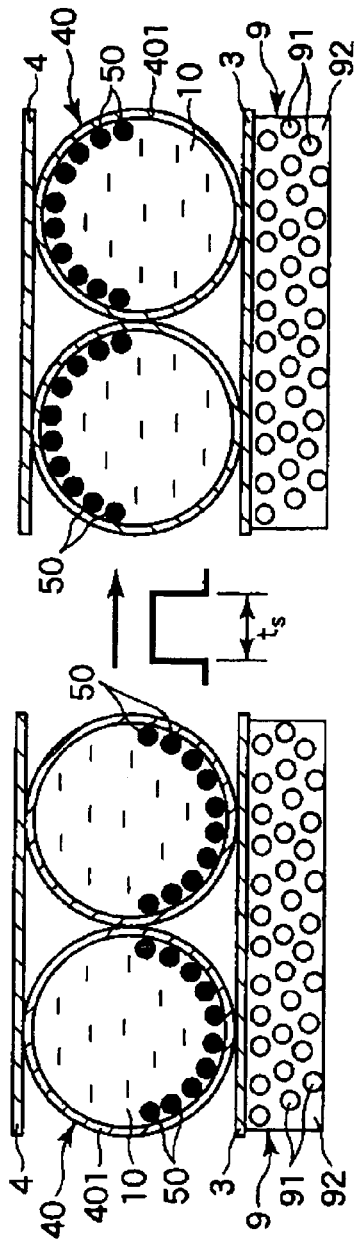

In this regard, a minimum value of a pulse width (the application time) of the pulse voltage, i.e., the electrical voltage applied to shift, as illustrated in FIG. 3A, the state that the adsorption particles 50 are positioned in the lower hemisphere of the capsule body 401 to the state that the adsorption particles 50 are positioned in the upper hemisphere of the capsule body 401 is defined as ts(V), wherein the ts is a function of the voltage value V of the electrical voltage applied.

Figure 3B:
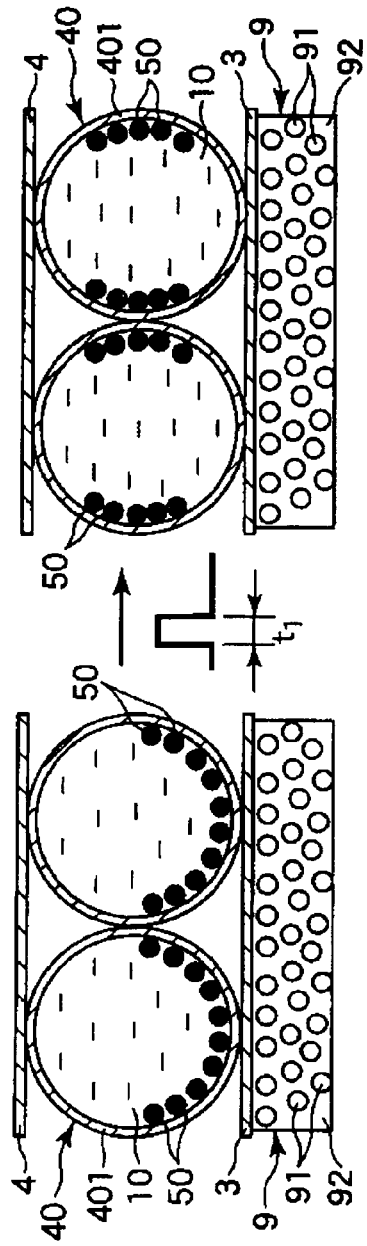

In this case, in order to shift, as illustrated in FIG. 3B, the state that the adsorption particles 50 are positioned in the lower hemisphere of the capsule body 401 to the state that the adsorption particles 50 are positioned between the lower and upper hemispheres, i.e., the state that the white color is displayed, a pulse width t1 of the electrical voltage applied is set at a specified value smaller than the ts (V).

The reason for this is that, since the adsorption particles 50 are moved upwardly along the inner surface of the capsule body 401 while maintaining the adsorbed state, the state that the adsorption particles 50 are positioned between the lower and upper hemispheres can be realized by stopping the application of the electrical voltage before the adsorption particles 50 are positioned in the upper hemisphere.

More specifically, the pulse width t1 of the electrical voltage applied is preferably in the range of 0.01×ts (V) to 0.6×ts (V), and more preferably in the range of 0.2×ts (V) to 0.4×ts (V). This makes it possible to increase light transmittance of the microcapsules 40, thereby clearly displaying the white color and increasing display contrast.

The pulse width t1 has been empirically found in advance and stored in a storage means not shown in the drawings.

When displaying the white color, the electrical voltage having the pulse width t1 is applied to between the first electrodes 3 and the second electrode 4 by means of a control means not shown in the drawings. This holds true for the intermediate tone.

In this regard, it is to be noted that the electrical voltage applied to between the first electrodes 3 and the second electrode 4 is not limited to a single pulse voltage, but may be multiple pulse voltages or other voltages.

Figure 3C:
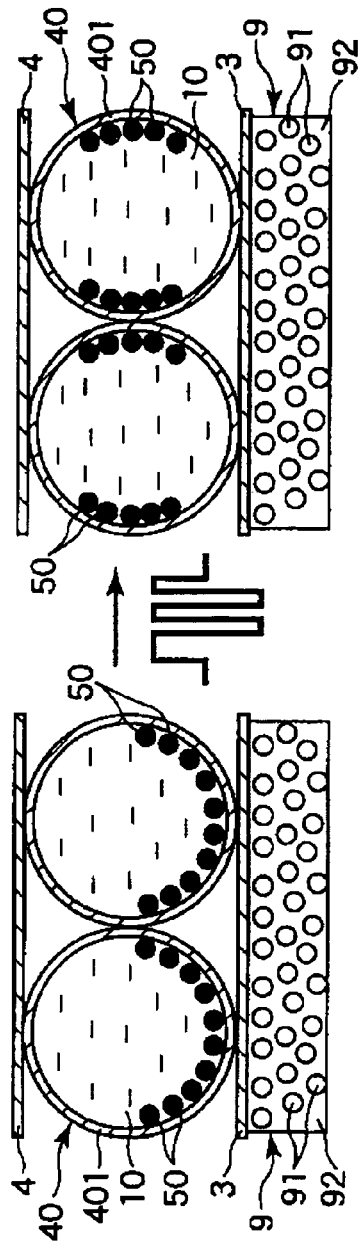

As a concrete example, it is desirable to use multiple pulse voltages (alternating voltages) with alternately changing polarities as illustrated in FIG. 3C. In this case, the respective pulse voltages may be applied either continuously as illustrated or intermittently, in which the former is preferred.

Further, pulse widths of the respective pulse voltages may be the same or different from each another. It is preferred that the pulse widths of the respective pulse voltages are equal to or smaller than the t1. It is also preferred that the pulse width of the initially applied pulse voltage is set greatest and the pulse widths of the subsequently applied pulse voltages are set smaller than the pulse width of the initially applied pulse voltage.

Use of the multiple pulse voltages with alternately changing polarities makes it possible to change a moving direction of the adsorption particles 50 upwardly and downwardly in an alternating manner. Therefore, it is possible to collect the adsorption particles 50 in a narrower region and, consequently, to increase the light transmittance of the microcapsules 40.

Figure 4:
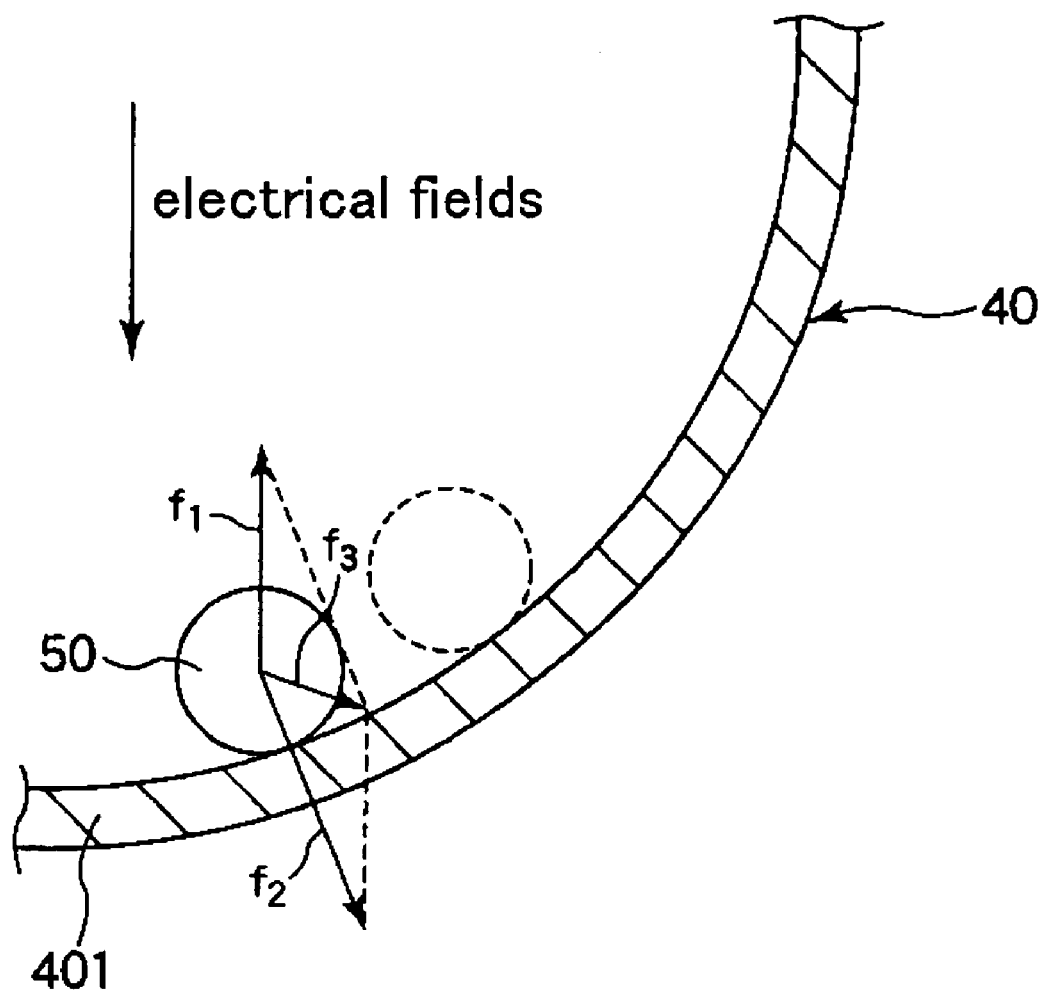

As shown in FIG. 4, the display device 20 is constructed to ensure that the attractive force ($f_2$ in FIG. 4) due to the interaction between the adsorption particles 50 and the capsule body 401 is greater than the electrostatic force ($f_1$ in FIG. 4) acting on the adsorption particles 50 due to the electrical fields generated between the first electrodes 3 and the second electrode 4.

The attractive force ($f_2$) amounts to the sum (the resultant force) of the electrostatic force and the van der Waals force between the adsorption particles 50 and the capsule body 401. The task of making the attractive force ($f_2$) greater than the electrostatic force ($f_1$) can be accomplished by suitably setting, e.g., a charge amount of the respective parts, charge density of the respective parts, or magnitude of the electrical voltage applied to between the first electrodes 3 and the second electrode 4.

Therefore, when the electrical voltage is applied to between the first electrodes 3 and the second electrode 4 and when the electrical fields generated therebetween act on the adsorption particles 50, the resultant force ($f_3$ in FIG. 4) of the electrostatic force ($f_1$) and the attractive force ($f_2$) acts in a direction as shown in FIG. 4.

This makes it possible to prevent the adsorption particles 50 from moving away from the capsule body 401, which ensures that the adsorption particles 50 are reliably moved along the inner surface of the capsule body 401 while maintaining the adsorbed state.

The phenomenon that the adsorption particles 50 are moved along the inner surface of the capsule body 401 while maintaining the adsorbed state is quite complex in view of a microscopic standpoint, as will be described below.

More specifically, a relationship (the attractive force, etc.) between the adsorption particles 50 and the capsule body 401 is significantly complex. The interaction between the adsorption particles 50 and the capsule body 401 can be explained using a potential curve illustrated in FIG. 5.

As illustrated in FIG. 5, in the potential curve, a valley of potential is created when summing up the attractive force between the adsorption particles 50 and the capsule body 401 (the resultant force of the van der Waals force and the electrostatic force) and a repulsive force (steric hindrance caused by polymer chains and osmotic pressure).

When a distance between a surface of each of the adsorption particles 50 and the inner surface of the capsule body 401 is $Z_0$ in FIG. 5, the adsorption particles 50 are adsorbed to the inner surface of the capsule body 401 in a position in which the surface of each of the adsorption particles 50 are spaced apart from the inner surface of the capsule body 401 by the distance $Z_0$. The distance $Z_0$ is on the order of nanometers. In this case, if the surfaces of the adsorption particles 50 have polymer chains, the polymer chains of the adsorption particles 50 and the capsule body 401 are in contact with each other.

If electrical fields are generated between the first electrodes 3 and the second electrode 4 in this state, the adsorption particles 50 are easily moved away from the inner surface of the capsule body 401. This is because a slope of the potential curve is zero in the position spaced apart by the distance $Z_0$.

As the adsorption particles 50 approach a position spaced apart by a distance $Z_1$, however, the slope of the potential curve becomes greater, thereby allowing an increased attractive force to act on the adsorption particles 50. Thus, the adsorption particles 50 are no longer able to move away from the inner surface of the capsule body 401 and, instead, are moved toward the inner surface of the capsule body 401.

As a result, if the electrical fields are generated between the first electrodes 3 and the second electrode 4, the adsorption particles 50 move along the inner surface of the capsule body 401. At this time, each of the adsorption particles 50 moves along the inner surface of the capsule body 401 while slightly changing the distance between the surface thereof and the inner surface of the capsule body 401 (while slightly bouncing up and down on the inner surface of the capsule body 401) as illustrated in FIG. 6.

In this embodiment, the capsule body (the shell) 401, into which the liquid 10 and the adsorption particles 50 are encapsulated, includes a first capsule layer (a first layer) 402 with the inner surface and a second capsule layer (a second layer) 403 arranged outside the first capsule layer 402, as shown in FIG. 1.

The first capsule layer 402 and the second capsule layer 403 are respectively formed into a spherical shell shape (a shell-like shape). An outer surface of the first capsule layer 402 is covered with the second capsule layer 403. This makes it possible to synergistically impart characteristics of the first capsule layer 402 and the second capsule layer 403 to the capsule body 401.

In the capsule body 401, one or both of the first capsule layer 402 and the second capsule layer 403 may be electrically charged.

Examples of a constituent material of each of the first capsule layer 402 and the second capsule layer 403 include a material containing gum such as gum arabic or the like, a composite material of gum arabic and gelatin, various kinds of resin materials such as urethane-based resin, acryl-based resin, epoxy-based resin, melamine-based resin, urea-based resin, polyamide and polyether, and the like. One or more of them can be used independently or in combination.

A cross-linking agent may be added to the resin of which each of the first capsule layer 402 and the second capsule layer 403 is made, so that the first capsule layer 402 and the second capsule layer 403 can have a cross-linked (three-dimensionally cross-linked) structure. This makes it possible to increase strength of each of the first capsule layer 402 and the second capsule layer 403. As a consequence, it is possible to surely prevent the microcapsules 40 from being collapsed.

In this regard, charging or non-charging, a charge amount, charge density and a polarity of each of the first capsule layer 402 and the second capsule layer 403 are also affected by the liquid 10. Therefore, the constituent material (the combination of components of the constituent material), a mixing ratio of the components and various forming conditions of each of the first capsule layer 402 and the second capsule layer 403 are suitably set depending on the liquid 10 used.

By doing so, each of the first capsule layer 402 and the second capsule layer 403 is electrically charged with a specified polarity, while adjusting the charge amount and the charge density thereof. In this case, additives such as a charging agent and the like may be added to the constituent material of each of the first capsule layer 402 and the second capsule layer 403.

Further, it is preferred that the first capsule layer 402 and the second capsule layer 403 are chemically bonded together in their interfacial surfaces. This makes it possible to reliably prevent any separation of the first capsule layer 402 and the second capsule layer 403 even when pressure is applied between the circuit board 22 and the display sheet 21.

As a result, it is possible to reliably prevent the microcapsules 40 from being collapsed due to the pressure applied at the time of bonding the microcapsule-containing layer 400 and the circuit board 22 together or due to an impact and a pressing force applied when the microcapsules 40 are used and stored as the display device 20.

A thickness of the capsule body 401 (a total sum of a thickness of the first capsule layer 402 and a thickness of the second capsule layer 403 in this embodiment) is not particularly limited to a specific value, but may be preferably in the range of 0.1 to 5 μm, more preferably in the range of 0.1 to 4 μm, and even more preferably in the range of 0.1 to 3 μm in a wet state.

If the thickness of the capsule body 401 is too small, there is a fear that great enough capsule strength of the capsule body 401 may not be obtained depending on combination of the constituent materials of the first capsule layer 402 and the second capsule layer 403.

In contrast, if the thickness of the capsule body 401 is too great, there is a fear that the transparency may be reduced depending on the combination of the constituent materials of the first capsule layer 402 and the second capsule layer 403, which may lead to reduction in the display contrast of the display device 20.

Although the capsule body 401 has two layers consisting of the first capsule layer 402 and the second capsule layer 403 in this embodiment, the capsule body 401 is not limited to this two layer construction, but may have a single layer construction or a multiple layer construction with three or more layers.

As for a particle size of the capsule body 401, a volume-average particle size thereof is preferably in the range of 10 to 100 μm, and more preferably in the range of 20 to 80 μm. If the particle size of the capsule body 401 falls within such a range, it is possible to form the microcapsule-containing layer 400 with increased dimensional accuracy.

If the particle size of the capsule body 401 is far smaller than the lower limit value noted above, there is a fear that both surfaces of the microcapsule-containing layer 400 may be full of the microcapsules 40, thereby reducing the display contrast of the display device 20.

In contrast, if the particle size of the capsule body 401 is far greater than the upper limit value noted above, there is a fear that the gaps between the microcapsules 40 grows wider, consequently reducing the display contrast of the display device 20.

It is preferred that the microcapsules 40 are formed to have a generally uniform or equal size (particle size). More specifically, a coefficient of variation (a CV value) of the particle size is preferably in the range of 5 to 25%, and more preferably in the range of 5 to 20%.

This ensures that the microcapsules 40 are arranged uniformly, thereby preventing or reducing occurrence of display variance in the display device 20. Thus, the display device 20 is capable of exercising superior display performance.

As will be set forth later, the display device 20 is generally manufactured by interposing the adhesive agent layer 8 between the circuit board 22 and the display sheet 21 and bonding the circuit board 22 and the display sheet 21 together under that state. The bonding is performed in a state that the circuit board 22 and the display sheet 21 are kept in close proximity to each other. Pressure is applied between the circuit board 22 and the display sheet 21 in order to bring them into close proximity to each other.

Further, when the display device 20 of the present invention is incorporated into an electronic paper that requires flexibility, flexural deformation occurs in the display device 20 each time the electronic paper is flexed. Every time the flexural deformation occurs, pressure is applied between the circuit board 22 and the display sheet 21.

The microcapsules 40 have strength great enough to keep a spherical shape between the second electrode 4 and the adhesive agent layer 8 even when the pressure is applied between the circuit board 22 and the display sheet 21. This makes it possible to increase pressure resistance and bleed resistance of the microcapsules 40, thereby ensuring that the display device 20 is stably operated for an extended period of time.

The term "pressure resistance of the microcapsules 40" used herein refers to a property with which the microcapsules 40 resist the pressure applied thereto without being crushed. The term "bleed resistance of the microcapsules 40" used herein refers to a property with which the liquid 10 contained in the microcapsules 40 is kept against dissipation to the outside.

2. Operating Method of Display Device

Such a display device 20 is operated as follows.

Hereinafter, a method of operating the display device 20 will be described with reference to FIG. 2. The following description will be made based on a representative instance wherein the adsorption particles 50 are negatively charged, with the capsule body 401 being charged positively, and wherein a state that the adsorption particles 50 are positioned near the first electrodes 3 (namely, a state that the black color is displayed) is set as an initial state.

When displaying the black color, an electrical voltage is applied to between the first electrodes 3 and the second electrode 4 so that the first electrodes 3 can be in a positive potential with respect to the second electrode 4. For the purpose of reliability, it is preferred that the electrical voltage is applied for a time long enough to allow the adsorption particles 50 to move from the second electrode 4 to the first electrodes 3.

As a consequence, the adsorption particles 50 are moved along the inner surface of the capsule body 401 toward the first electrodes 3 while maintaining the adsorbed state until they are stopped near the first electrodes 3. Therefore, the portion of the reflector 9 lying just below the space surrounded by the capsule body 401 is fully covered with the adsorption particles 50 as viewed from the display surface side of the display device 20, thereby displaying the black color.

When displaying the white color (particularly when the white color is displayed at first without displaying the black color after a power-on operation), the display device 20 is first restored to the initial state (that is, the state that the black color is displayed) as described above.

Thereafter, the pulse voltage having the above noted pulse width t1 is applied to between the first electrodes 3 and the second electrode 4 so that the first electrodes 3 can be in a negative potential with respect to the second electrode 4.

Consequently, the adsorption particles 50 are moved along the inner surface of the capsule body 401 toward the second electrode 4 maintaining the adsorbed state until they are stopped between the first electrodes 3 and the second electrode 4, i.e., until they are positioned on the inner surface between the upper and lower hemispheres of the capsule body 401.

This creates a state that the portion of the reflector 9 lying just below the space surrounded by the capsule body 401 is not covered with the adsorption particles 50 as viewed from the display surface side of the display device 20, thereby displaying the white color.

In this case, almost all (most) of light incident on the microcapsules 40 passes through the microcapsules 40 and arrives at the reflector 9 where light is scattered by the particles 91. Consequently, the light is diffusely reflected from the reflector 9. Therefore, the display device 20 is seen white when viewed from the display surface side thereof. In other words, the reflector 9 serves as a surface light source.

If attention is drawn to a specific microcapsule 40, it is sometimes a case that a part of the light incident on the reflector 9 through the microcapsule 40 is guided by the reflector 9 and emitted from another microcapsule 40 lying next to the specific microcapsule 40. That is to say, the reflector 9 has a function of guiding the light from one microcapsule 40 to a neighboring microcapsule 40 (namely, a light guiding function).

Among the light diffusely reflected by the reflector 9, light having an increased reflection angle (light reflected toward a neighboring microcapsule 40) is absorbed by the adsorption particles 50 and therefore is prevented from affecting the display performance in the neighboring microcapsule 40.

When displaying the gray color as the intermediate tone, the display device 20 is first restored to the initial state as is the case when displaying the white color. Thereafter, the pulse voltage having the specified pulse width is applied to between the first electrodes 3 and the second electrode 4 so that the first electrodes 3 can be in a negative potential with respect to the second electrode 4, thereby displaying the gray color of the desired gradation.

In this case, analytical curves (e.g., arithmetic expressions, tables, etc.) showing a correlation between a gray color of different gradations (respective intermediate tones) and a voltage application time (a pulse width of the pulse voltage) has been empirically found in advance and stored in a storage means not shown in the drawings.

Based on these analytical curves, a control means not shown in the drawings calculates a voltage application time required in obtaining the gray color of the desired gradation (the desired intermediate tone) and applies an electrical voltage for the voltage application time thus calculated.

As described above, the display device 20 is capable of providing the white and black display and displaying desired information (a desired image).

It goes without saying that other colored particles (e.g., cyan (C) particles, magenta (M) particles, yellow (Y) particles, red (R) particles, green (G) particles and blue (B) particles) may be used as the adsorption particles 50. In this case, it is possible to display arbitrary intermediate tones between those colors and the white color in the same manner as described above. In this case, it becomes possible to provide color display and full color display.

3. Method of Manufacturing Display Device

The display device 20 described above can be manufactured in the following manner. Hereinafter, a method of manufacturing the display device 20 will be described with reference to FIGS. 7A to 7D and 8E to 8G.

The method of manufacturing the display device 20 illustrated in FIGS. 7A to 7D and 8E to 8G includes a microcapsule production step [A1] for producing the microcapsules 40, a microcapsule dispersion liquid preparation step [A2] for preparing a microcapsule dispersion liquid containing the microcapsules 40, a microcapsule-containing layer formation step [A3] for forming the microcapsule-containing layer 400 containing the microcapsules 40 on one surface of the base substrate 12, an adhesive agent layer formation step [A4] for forming the adhesive agent layer 8 on an opposite surface of the microcapsule-containing layer 400 from the base substrate 12, a bonding step [A5] for bringing the opposite substrate 11 into contact with an opposite surface of the adhesive agent layer 8 from the microcapsule-containing layer 400 and bonding the adhesive agent layer 8 and the opposite substrate 11 together, and a sealing step [A6] for forming the sealing portion 7.

The microcapsule production step [A1], the microcapsule dispersion liquid preparation step [A2] and the microcapsule-containing layer formation step [A3] constitute a microcapsule-containing layer formation step in the method of manufacturing the display device according to the present invention.

A step for producing the base substrate 12 to be prepared in the microcapsule-containing layer formation step [A3] includes a second electrode formation step for forming the second electrode 4 on the lower surface of the base portion 2.

A step for producing the circuit board 22 to be prepared in the bonding step [A5] includes a first electrode formation step for forming the first electrodes 3 on the upper surface of the reflector 9 provided on the base portion 2.

The second electrode formation step and the first electrode formation step constitute an electrode formation step in the method of manufacturing the display device according to the present invention.

Hereinafter, description will be made on the respective steps.

[A1] Microcapsule Production Step
[A1-1] Formation of First Capsule Layer

First obtained are microcapsules in which the liquid 10 and the adsorption particles 50 are encapsulated into the first capsule layer 402. For the purpose of convenience in description, these microcapsules will be referred to as "pre-microcapsules (microcapsule precursors)" hereinbelow.

The first capsule layer 402 can be formed by various kinds of a microcapsule production method, using a controlled liquid composed of the liquid 10 and the adsorption particles 50 as a core material.

The microcapsule production method (a method of encapsulating the controlled liquid into the first capsule layer 402) is not particularly limited to a specific type, but examples of the microcapsule production method include an interfacial polymerization method, an in-situ polymerization method, a phase separation method (or a coacervation method), an interfacial sedimentation method and a spray drying method. These microcapsule production methods may be suitably selected depending on the constituent material of the first capsule layer 402 or other conditions.

In this regard, the first capsule layer 402 is not electrically charged during the process of forming the same. Instead, a step of electrically charging the capsule body 401 is performed after the formation of the first capsule layer 402. If the first capsule layer 402 is electrically charged during the process of forming the same, the adsorption particles 50 will be adsorbed to and embedded in (or fixed to) the first capsule layer 402 due to the electrostatic force therebetween. Such a problem can be surely avoided by not electrically charging the first capsule layer 402.

The pre-microcapsules having a uniform size can be obtained by using, e.g., a sieving method, a filtering method or a specific gravity difference sorting method.

[A1-2] Formation of Second Capsule Layer

Next, the second capsule layer 403 is formed on the outer surface of each of the pre-microcapsules (the first capsule layer 402) obtained in the step [A1-1], thereby producing the microcapsules 40 which include the liquid 10 and the adsorption particles 50 therein.

The second capsule layer 403 can be formed by, e.g., gradually adding a resin prepolymer to a capsule dispersion liquid in which the pre-microcapsules are dispersed in an aqueous medium and causing a condensation reaction to the prepolymer adsorbed to the outer surfaces of the pre-microcapsules.

By doing so, the second capsule layer 403 is formed on the outer surface of each of the pre-microcapsules, thus producing the microcapsules 40 containing the liquid 10 and the adsorption particles 50.

When forming the second capsule layer 403, the capsule body 401 (one or both of the first capsule layer 402 and the second capsule layer 403) is electrically charged with the opposite polarity to the adsorption particles 50. Namely, this step in this embodiment corresponds to the charging step of the present invention.

In this case, as mentioned earlier, the constituent material (the combination of components of the constituent material), the mixing ratio of the components and the various forming conditions of each of the first capsule layer 402 and the second capsule layer 403 are suitably set depending on the liquid 10 used.

By doing so, at least one of the first capsule layer 402 and the second capsule layer 403 is electrically charged with the opposite polarity to the adsorption particles 50, while adjusting the charge amount and the charge density thereof. Through this charging step, the adsorption particles 50 are adsorbed to the inner surface of the capsule body 401 due to the electrostatic force therebetween.

The microcapsules 40 having a uniform size can be obtained by using, e.g., a sieving method, a filtering method or a specific gravity difference sorting method.

As set forth above, in the microcapsule production step [A1] of the method of this embodiment, the charging step for electrically charging the capsule body 401 with the opposite polarity to the adsorption particles 50 is performed after forming the first capsule layer 402 that constitutes an inner portion of the capsule body 401.

[A2] Microcapsule Dispersion Liquid Preparation Step

Next, the binder 41 is prepared, and then this binder 41 is mixed with the microcapsules 40 produced in the step [A1] to thereby obtain a microcapsule dispersion liquid.

A mixing ratio of the binder 41 and the microcapsules 40 produced in the step [A1] is such that the microcapsules 40 are preferably in the range of 100 to 500 parts by weight, and more preferably in the range of 200 to 450 parts by weight, based on 100 parts by weight of the binder 41.

An amount of the microcapsules 40 contained in the microcapsule dispersion liquid is preferably in the range of about 30 to 60 wt %, and more preferably in the range of about 40 to 60 wt %.

If the amount of the microcapsules 40 is set to fall within the above-noted range, there is provided a great advantage in that the microcapsules 40 can be moved (or rearranged) within the microcapsule-containing layer 400 in such a manner as not to overlap one another in a thickness direction thereof (namely, in such a manner as to form a single layer).

[A3] Microcapsule Layer Formation Step

Figure 7A:
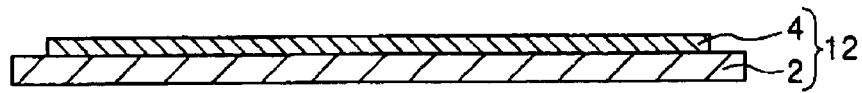
FIGS. 7A to 7D and 8E to 8G are pattern diagrams for explaining a method of manufacturing the display device shown in FIG. 1.
Figure 7B:
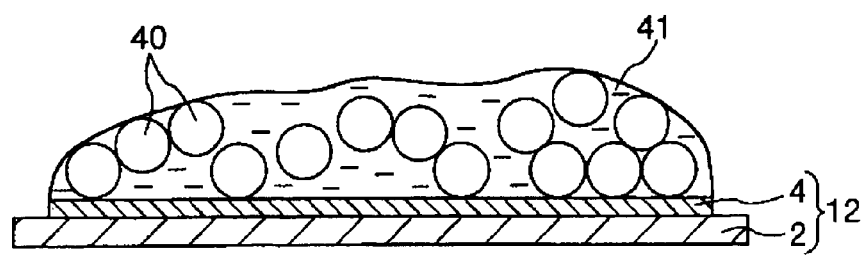

Next, the base substrate 12 is prepared as illustrated in FIG. 7A. Then, the microcapsule dispersion liquid prepared in the step [A2] is applied on the base substrate 12 as illustrated in FIG. 7B.

A method of applying the microcapsule dispersion liquid is not particularly limited to a specific type. As the method, various kinds of application methods such as an applicator method, a bar coater method, a die coater method, an air knife coater method, a kiss coater method and a gravure coater method can be used.

If necessary, the microcapsule dispersion liquid is leveled so that a thickness (a quantity) thereof can become uniform across the base substrate 12, preferably so that the microcapsules 40 can be arranged side by side (in a single layer) without overlapping one another in a thickness direction of a liquid coating composed of the microcapsule dispersion liquid.

Figure 7C:
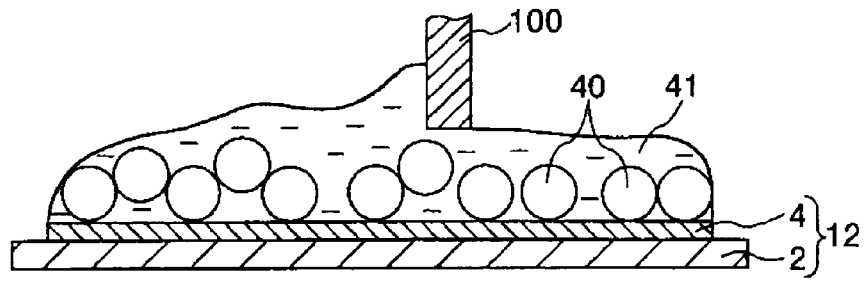
Figure 7D:
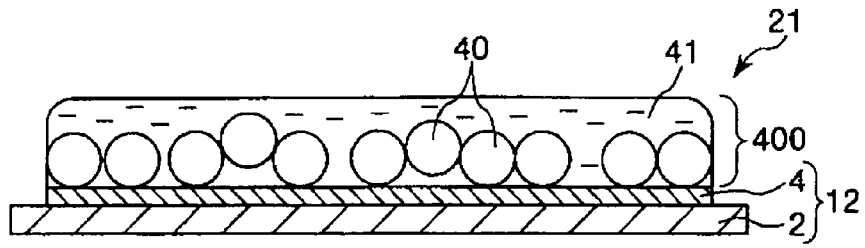

The leveling operation can be performed by, e.g., horizontally moving a squeegee (a plate-like jig) above the base substrate 12 to sweep the microcapsules 40 as illustrated in FIG. 7C. Thus, the microcapsule-containing layer 400 is formed and the display sheet 21 is obtained as illustrated in FIG. 7D.

[A4] Adhesive Agent Layer Formation Step

Figure 8E:
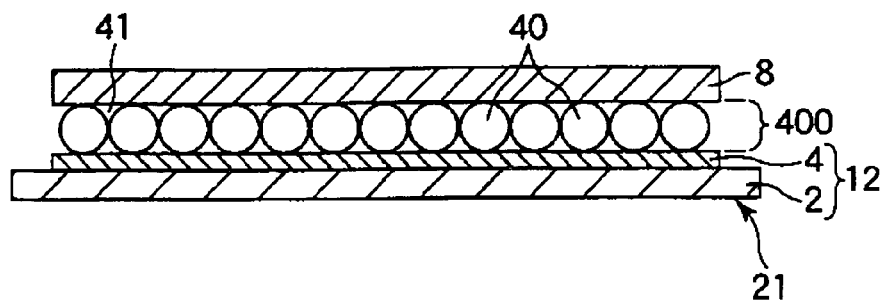

Next, the adhesive agent layer 8 is formed on the microcapsule-containing layer 400 as illustrated in FIG. 8E.

This step can be performed by, e.g., arranging an adhesive agent layer 8 having a sheet shape on the microcapsule-containing layer 400 using an overcoat method, a transfer method or the like.

[A5] Circuit Board Bonding Step

Figure 8F:
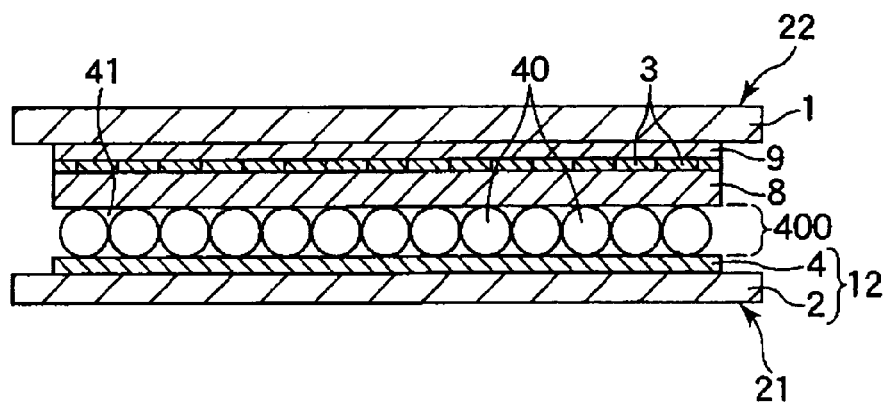

Next, as illustrated in FIG. 8F, the circuit board 22 prepared separately is laminated on the adhesive agent layer 8 so that the first electrodes 3 can come into contact with the adhesive agent layer 8. By doing so, the display sheet 21 and the circuit board 22 are bonded together through the adhesive agent layer 8.

At this time, an arrangement density of the microcapsules 40 in the microcapsule-containing layer 400 can be made uniform due to weight of the adhesive agent layer 8 and the circuit board 22 or by pressing the circuit board 22 and the display sheet 21 toward each other (by reducing the thickness of the microcapsule-containing layer 400).

When pressing the circuit board 22 and the display sheet 21 toward each other, magnitude of the pressure applied thereto is usually set equal to about 0.05 to 0.6 MPa.

However, in this display sheet 21 (this display device 20), the pressure is set to ensure that the microcapsules 40 contained in the microcapsule-containing layer 400 can be kept in a generally spherical shape without being compressed (pressed) in an up-and-down direction thereof, even if the microcapsule-containing layer 400 is pinched by the second electrode 4 and the adhesive agent layer 8 in a state that the pressure of the above noted magnitude is applied to between the circuit board 22 and the display sheet 21.

Consequently, it is possible to surely prevent collapse of the microcapsules 40 and dissipation of the liquid 10 and the adsorption particles 50, which would otherwise be caused by the pressure applied to between the circuit board 22 and the display sheet 21. Furthermore, it is possible for the adsorption particles 50 to smoothly and reliably move along the inner surface of the capsule body 401.

[A6] Sealing Step

Figure 8G:
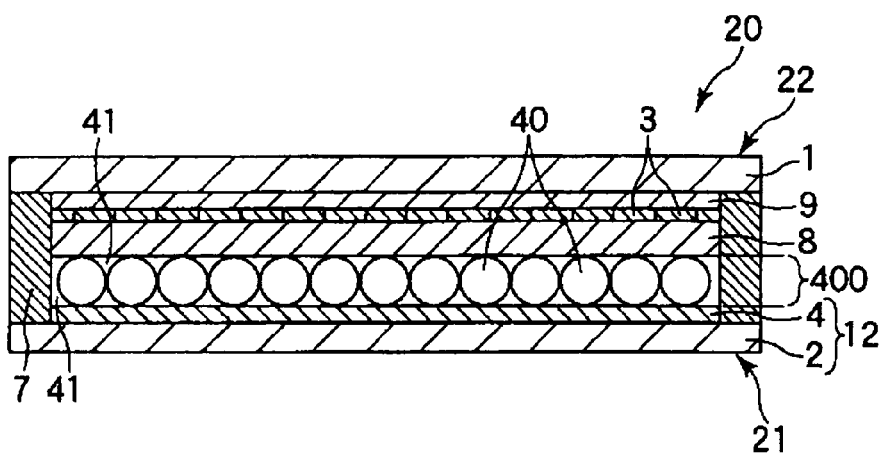

Next, as illustrated in FIG. 8G, the sealing portion 7 is formed along the edges of the display sheet 21 and the circuit board 22.

The sealing portion 7 can be formed by supplying a sealing portion formation material to between the display sheet 21 (the base portion 2) and the circuit board 22 (the base portion 1) along the edges thereof through use of, e.g., a dispenser, and then solidifying or curing the sealing portion formation material.

The display device 20 is manufactured through the steps described above.

The adhesive agent layer 8 may be arranged only on the circuit board 22 or on both of the circuit board 22 and the display sheet 21 to thereby bond the circuit board 22 and the display sheet 21 together.

It is preferred that the adhesive agent layer 8 having the sheet shape is arranged on the microcapsule-containing layer 400 by bending the same, bringing one end portion thereof into contact with microcapsule-containing layer 400 and allowing the same to progressively come into contact with the microcapsule-containing layer 400 from one end toward the other end.

By doing so, it is possible to prevent air bubbles from being left between the microcapsule-containing layer 400 and the adhesive agent layer 8, and to reliably rearrange the microcapsules 40.

The adhesive agent layer 8 may be omitted, and the display sheet 21 and the circuit board 22 may be bonded together using other methods. As one example of other methods, the display sheet 21 and the circuit board 22 may be bonded together by means of the binder 41.

According to the display device 20 described above, the adsorption particles 50 are always adsorbed to any region on the inner surface of the capsule body 401. The adsorption particles 50 are reliably moved along the inner surface of the capsule body 401 while maintaining the absorbed state. Further, no particle (obstacle) other than the adsorption particles 50 is present within the capsule body 401. Therefore, it is possible to easily and reliably obtain the intermediate tone.

In addition, since the adsorption particles 50 are adsorbed to the inner surface of the capsule body 401 even at the stoppage of the application of the electrical voltage to between the first electrodes 3 and the second electrode 4, it is possible to reliably maintain the individual colors including the intermediate tone. This ensures that the display content (the image) is stably maintained with no deterioration of its display state even at the stoppage of the voltage application.

Owing to the fact that the adsorption particles 50 are adsorbed to the inner surface of the capsule body 401 and further that no particle (obstacle) other than the adsorption particles 50 is present within the capsule body 401, the adsorption particles 50 are prevented from being adsorbed to other particles. This makes it possible to exhibit high display contrast and to improve chromatic purity.

Inasmuch as no particle (obstacle) other than the adsorption particles 50 is present within the capsule body 401, the adsorption particles 50 can move easily and reliably. This enhances responsiveness in display.

Seeing that the adsorption particles 50 are moved along the inner surface of the capsule body 401 while maintaining the adsorbed state, it is possible to reliably move the adsorption particles 50 with relatively weak electrical fields, thereby reducing power consumption of the display device 20.

This display device 20 is a so-called microcapsule type and therefore can be manufactured more easily and reliably than what is called a microcup type display device.

Second Embodiment

Hereinafter, a second embodiment will be described, with emphasis placed on the differing points from the first embodiment but with no description made on the same matters.

In a method of manufacturing a display device 20 of the second embodiment, the capsule body 401 is not electrically charged when forming the same. After the capsule body 401 has been formed in its entirety, namely after the microcapsule production step [A1] has been completed, a charging step for electrically charging the capsule body 401 with the opposite polarity to the adsorption particles 50 through the binder 41 is performed in the microcapsule-containing dispersion liquid preparation step [A2] (that is, when preparing the microcapsule dispersion liquid).

In this case, a specified amount of positive or negative charging agent may be added to the binder 41 depending on the polarity of the adsorption particles 50. This makes it possible to adjust the charge amount and the charge density of the capsule body 401 while electrically charging the capsule body 401 with the opposite polarity to the adsorption particles 50. In this regard, it is to be noted that the binder 41 may be or may not be electrically charged.

The display device 20 thus constructed can exercise the same advantageous effects as those of the display device 20 of the first embodiment.

Third Embodiment

Figure 9:
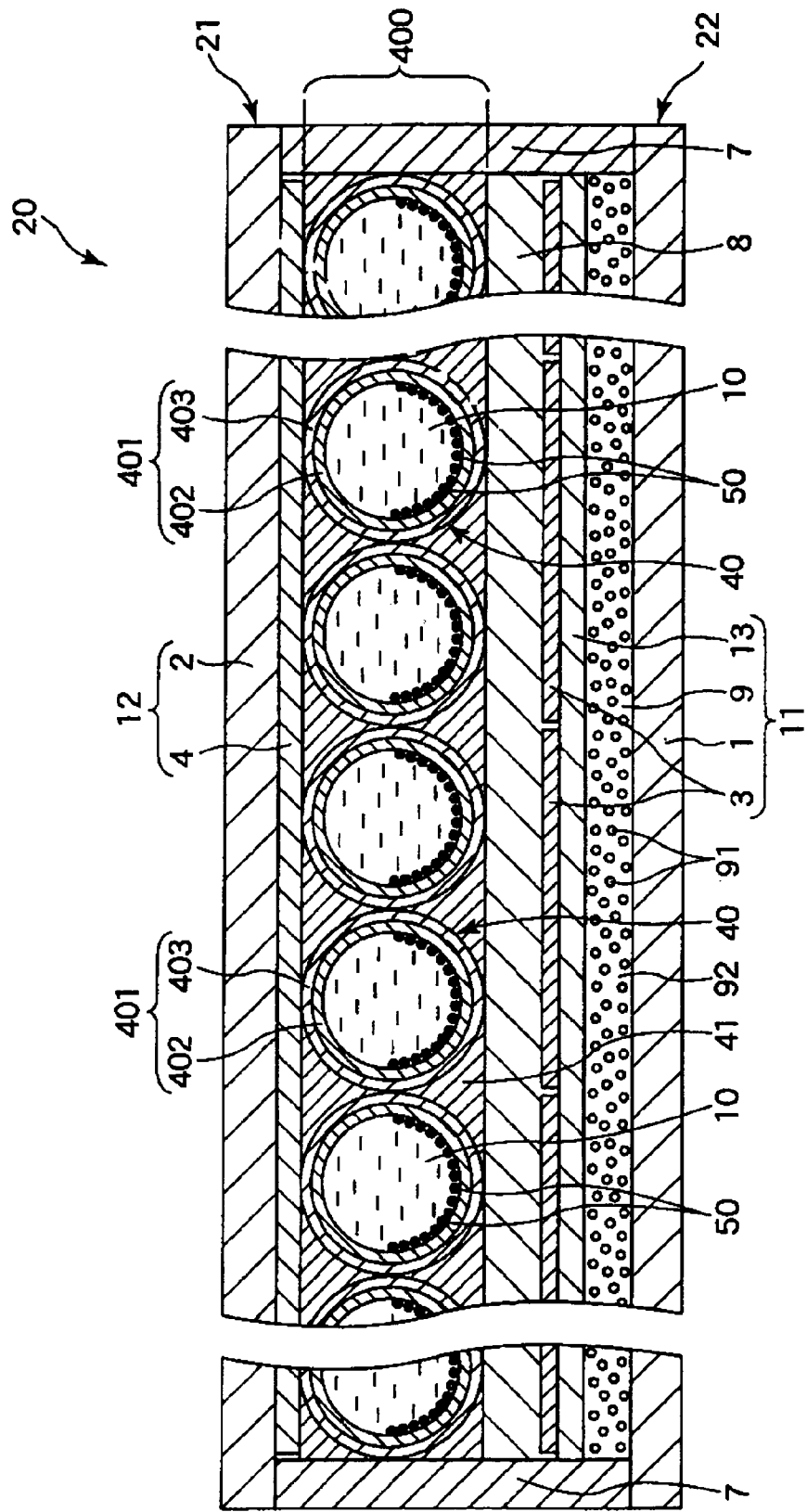
FIG. 9 is a vertical section view schematically showing a third embodiment of a display device according to the present invention.

FIG. 9 is a vertical section view schematically showing a third embodiment of a display device according to the present invention. In the following description, the upper side in FIG. 9 will be referred to as "upper" with the lower side as "lower", for the purpose of convenience in description.

Hereinafter, the third embodiment will be described, with emphasis placed on the differing points from the first embodiment but with no description made on the same matters.

As shown in FIG. 9, a display device 20 of the third embodiment includes a color filter 13 provided between the first electrodes 3 (the microcapsule-containing layer 400) and the reflector 9, which makes it possible to provide color display. Particularly, different kinds of the color display can be provided by arbitrarily setting construction (e.g., kinds of colors and the number of colors) of the color filter 13.

The color filter 13 is not particularly limited to a specific type, but may be, e.g., of a type having colored portions each providing different colors, specifically a type having a first colored portion, a second colored portion and a third colored portion (not shown) whose colors are different from each another.

Full color display can be provided by using the first, second and third colored portions as a red filter region (R), a green filter region (G) and a blue filter region (B), respectively. In this case, one set of the first, second and third colored portions are arranged in a corresponding relationship with three neighboring first electrodes 3 so that they can constitute a single pixel.

The display device 20 thus constructed can exercise the same advantageous effects as those of the display device 20 of the first embodiment.

With the conventional display devices, full color display is provided by using a red color displaying microcapsule containing red particles, a green color displaying microcapsule containing green particles, and a blue color displaying microcapsule containing blue particles.

In the conventional display devices, there is a need to arrange the respective color displaying microcapsules on corresponding electrodes. Thus, a difficulty is encountered in positioning the respective color displaying microcapsules on the corresponding electrodes.

In the above display device 20, it is not necessary to perform such a positioning operation. The reason is as follows. In the display device 20, the respective microcapsules 40 have the same construction, and the first, second and third colored portions of the color filter 13 correspond to the respective first electrodes 3.

Therefore, the microcapsules 40 placed on the first, second and third colored portions serve to display the red color, the green color and the blue color, respectively. This makes it possible to easily and reliably manufacture a display device 20 for full color display.

Alternatively, the first, second and third colored portions of the color filter 13 may be used as a cyan filter region (C), a magenta filter region (M) and a yellow filter region (Y), respectively.

Electronic Apparatus

The display device 20 described above can be used for constituting a variety of electronic apparatuses. Hereinafter, description will be made on examples of an electronic apparatus of the present invention provided with the display device 20.

Electronic Paper

First, description will be offered regarding an embodiment in which the electronic apparatus of the present invention is used in an electronic paper.

Figure 10:
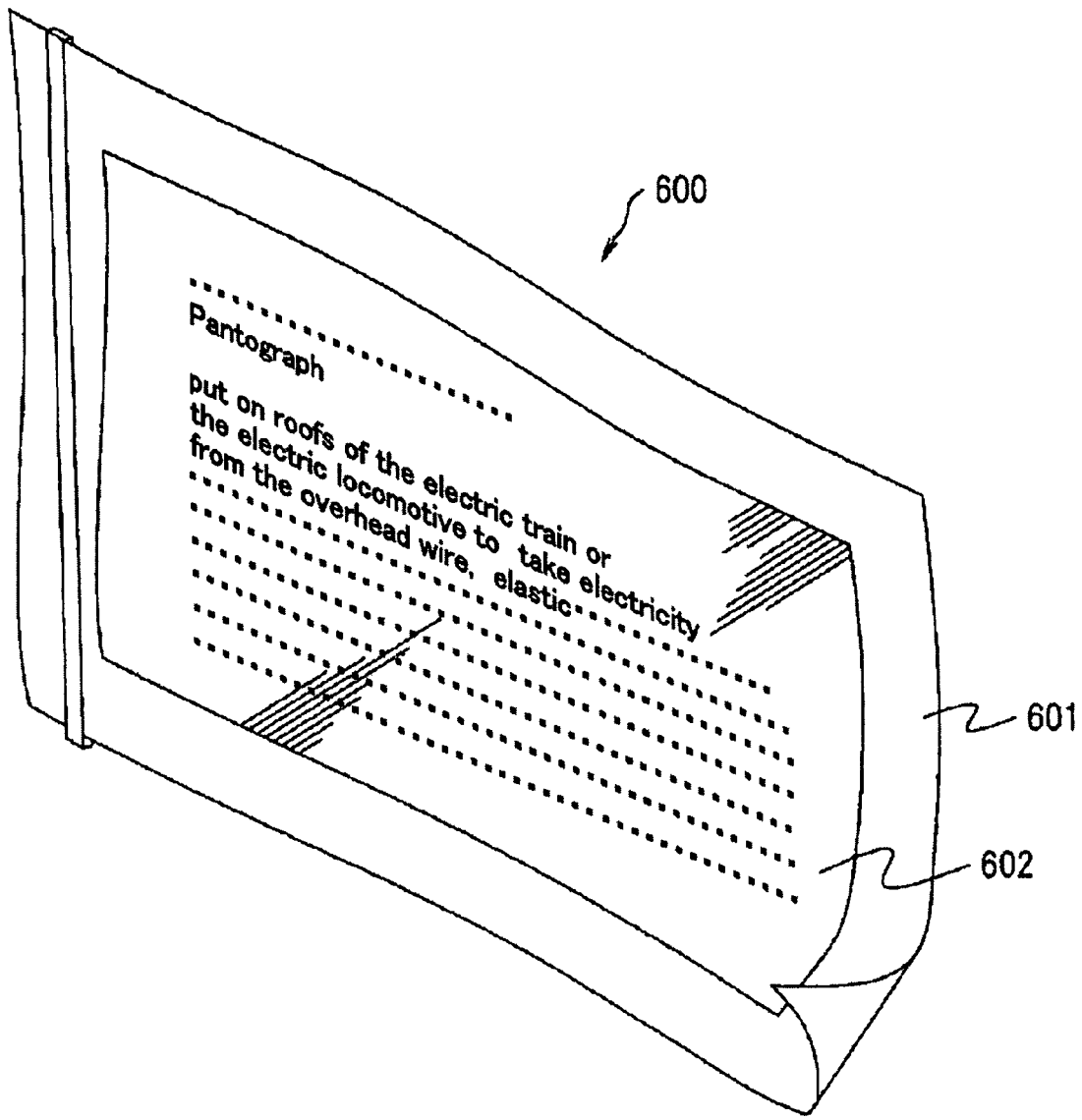
FIG. 10 is a perspective view showing an embodiment in which an electronic apparatus according to the present invention is used in an electronic paper.

FIG. 10 is a perspective view showing an embodiment in which the electronic apparatus according to the present invention is used in an electronic paper.

The electronic paper 600 shown in FIG. 10 includes a main body 601 formed of a rewritable sheet having the same texture and flexibility as that of a paper sheet, and a display unit 602 attached to the main body 601. In the electronic paper 600, the display unit 602 is formed from the display device 20 described above.

Display Apparatus

Next, description will be offered regarding an embodiment in which the electronic apparatus of the present invention is used in a display apparatus.

Figure 11A:
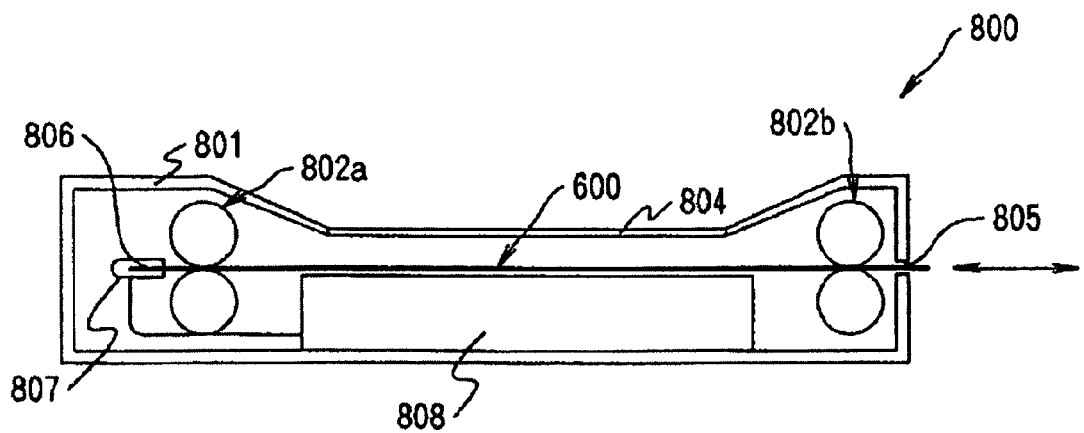
FIGS. 11A and 11B are section and plan views showing an embodiment in which an electronic apparatus according to the present invention is used in a display apparatus.
Figure 11B:
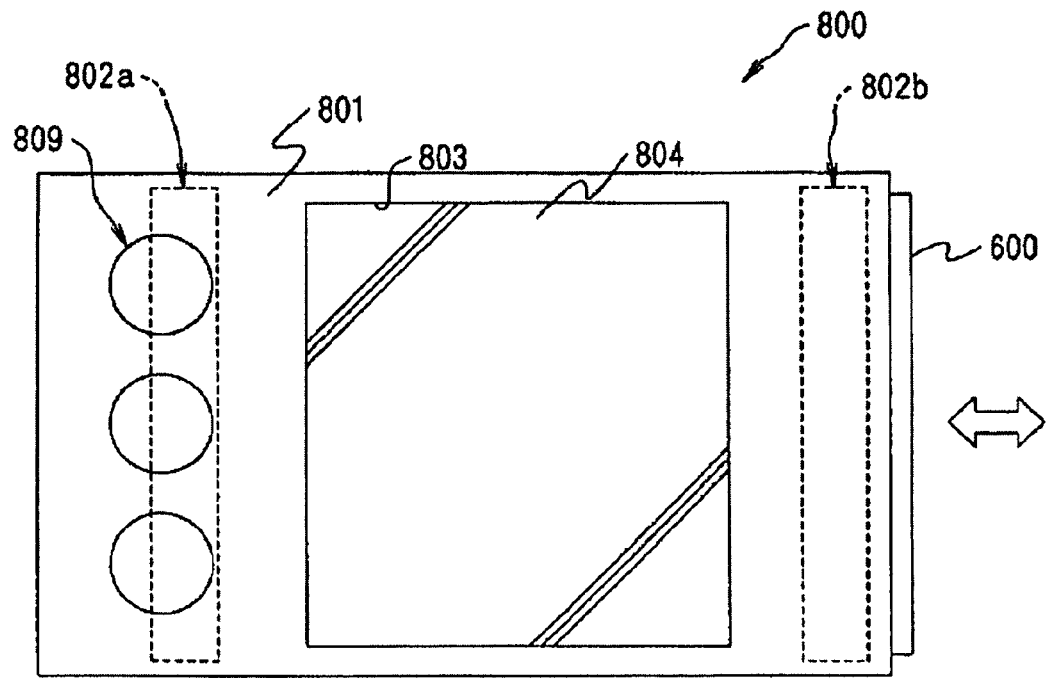

FIGS. 11A and 11B are section and plan views showing an embodiment in which the electronic apparatus according to the present invention is used in a display apparatus.

The display apparatus 800 shown in FIGS. 11A and 11B includes a main body portion 801 and an electronic paper 600 detachably attached to the main body portion 801. The electronic paper 600 is of the same configuration as set forth above, i.e., the same configuration as shown in FIG. 10.

Formed on one lateral side (the right side in FIG. 11A) of the main body portion 801 is an insertion slot 805 through which the electronic paper 600 can be inserted. Two pairs of conveying rollers 802a and 802b are provided within the main body portion 801.

When the electronic paper 600 is inserted into the main body portion 801 through the insertion slot 805, the electronic paper 600 is held within the main body portion 801 in a state that it is gripped by means of the pairs of conveying rollers 802a and 802b.

A rectangular opening 803 is formed on a display surface side (the front side in FIG. 11B) of the main body portion 801 and a transparent glass plate 804 is fitted to the rectangular opening 803. This allows the electronic paper 600 held within the main body portion 801 to be visually recognized from the outside of the main body portion 801.

In other words, the display apparatus 800 has a display surface that allows the electronic paper 600 held within the main body portion 801 to be visually recognized through the transparent glass plate 804.

A terminal portion 806 is formed in a leading edge portion (the left side in FIGS. 11A and 11B) of the electronic paper 600. Provided within the main body portion 801 is a socket 807 that makes contact with the terminal portion 806 when the electronic paper 600 is placed within the main body portion 801. A controller 808 and an operation part 809 are electrically connected to the socket 807.

In the display apparatus 800 set forth above, the electronic paper 600 is removably fitted to the main body portion 801 and is portable in a state that it is removed from the main body portion 801.

Furthermore, the electronic paper 600 of the display apparatus 800 is formed from the display device 20 described above.

In this regard, it is to be noted that the electronic apparatus of the present invention is not limited to the uses as described above. Examples of other uses of the electronic apparatus include a television set, a viewfinder type or monitor viewing type video tape recorder, a car navigation system, a pager, a personal digital assistance, an electronic calculator, an electronic newspaper, a word processor, a personal computer, a workstation, a picture phone, a POS terminal, a device provided with a touch panel and the like. The display device 20 of the present invention can be used in display parts of the various kinds of electronic apparatuses described above.

While the present invention has been described hereinabove based on the illustrated embodiments, the present invention is not limited thereto. The construction of each part may be replaced by an arbitrary construction having the same function.

Furthermore, other arbitrary constituents or steps may be added to the present invention. In addition, the present invention may be embodied by combining two or more arbitrary constituents (features) of the respective embodiments described above.

While a pair of electrodes is provided in a mutually facing relationship in the foregoing embodiments, the present invention is not limited thereto, but may be applied to, e.g., a construction in which a pair of electrodes is provided on the same substrate.

While a pair of substrates is provided in a mutually facing relationship in the foregoing embodiments, the present invention is not limited thereto, but may be applied to, e.g., a construction having a single substrate.

While the microcapsules are arranged so as not to straddle the neighboring pixel electrodes in the foregoing embodiments, the present invention is not limited thereto. Alternatively, the microcapsules may be arranged to straddle, e.g., two neighboring pixel electrodes or three or more neighboring pixel electrodes. Such arrangement patterns may be used in combination.

While the foregoing embodiments are directed to a so-called microcapsule type display device, the present invention is not limited thereto, but may be applied to, e.g., a display device in which an adsorption particle-containing layer including the adsorption particles and the transparent medium is divided by partition walls, that is, a so-called microcup type display device.

Specifically, the microcup type display device includes a plurality of cell spaces divided by the partition walls, the transparent medium provided within the respective cell spaces and the adsorption particles adsorbed to inner surfaces (cell space side surfaces) of the partition walls.

In the microcup type display device, it is preferred that the partition walls for defining the cell spaces filled with the transparent medium have inner curved concave surfaces extending (continuously extending) between a pair of electrodes. In particular, it is preferred that the partition walls define spherical or ellipsoidal spaces filled with the transparent medium.

What is claimed is:

1. A display device having a display surface, comprising:
an adsorption particle-containing layer including a wall portion with an inner surface for defining a space, a plurality of electrically charged adsorption particles provided within the space in an adsorbed state so that the plurality of electrically charged adsorption particles are adsorbed to the inner surface of the wall portion, and a transparent medium provided within the space, the transparent medium being substantially transparent; and
a pair of electrodes that, when applied with an electrical voltage, generate electrical fields to act on the adsorption particles,
wherein in the case where the electrical voltage is applied between the electrodes, the adsorption particles are moved along the inner surface of the wall portion while maintaining the adsorbed state, and
wherein the adsorption state is maintained at stoppage of application of the electrical voltage between the electrodes.

2. The display device as claimed in claim 1, wherein the adsorption particles are adsorbed to the inner surface of the wall portion due to an electrostatic force therebetween.

3. The display device as claimed in claim 1, wherein the adsorption particles and the wall portion are electrically charged with opposite polarities to each other so that the adsorption particles are adsorbed to the inner surface of the wall portion due to the opposite polarities thereof.

4. The display device as claimed in claim 3, wherein an attractive force due to an interaction between the adsorption particles and the wall portion including the electrostatic force therebetween is greater than an electrostatic force acting on the adsorption particles due to the electrical fields generated between the electrodes.

5. The display device as claimed in claim 1, wherein the transparent medium comprises a liquid or a gas filled in the space.

6. The display device as claimed in claim 1, wherein the adsorption particles comprise colored particles.

7. The display device as claimed in claim 1, wherein the electrodes are provided in a mutually facing relationship through the adsorption particle-containing layer, and the inner surface of the wall portion has a curved concave surface extending between the electrodes.

8. The display device as claimed in claim 1, wherein the space is defined into a spherical shape or an ellipsoidal shape by means of the wall portion.

9. The display device as claimed in claim 1, wherein the wall portion is formed of a shell, and the adsorption particles and the transparent medium are encapsulated into the shell to form a microcapsule.

10. The display device as claimed in claim 9, wherein the shell comprises a first layer and a second layer arranged outside the first layer, the first layer and the second layer each having a shell-like shape.

11. The display device as claimed in claim 1, further comprising a reflector that diffusely reflects light and is provided on an opposite side of the adsorption particle-containing layer from the display surface.

12. The display device as claimed in claim 11, wherein the reflector includes a plurality of particles capable of scattering light.

13. The display device as claimed in claim 11, wherein by selecting one of different patterns of applying the electrical voltage between the electrodes, the adsorption particles are moved so as to change a state in which a portion of the reflector lying just below the space surrounded by the wall portion as viewed from the display surface is covered with the adsorption particles into a state in which the portion of the reflector is not covered with the adsorption particles and vice versa.

14. The display device as claimed in claim 13, wherein by selecting one of different patterns of applying the electrical voltage between the electrodes, an area of a region covered with the adsorption particles in the portion of the reflector lying just below the space surrounded by the wall portion as viewed from the display surface is adjustable.

15. The display device as claimed in claim 11, further comprising a color filter provided between the adsorption particle-containing layer and the reflector.

16. An electronic apparatus provided with the display device defined by claim 1.

17. The display device as claimed in claim 1, wherein a first electrode of the pair of electrodes is provided on a side of the display surface, and a second electrode of the pair of electrodes is provided on an opposite side of the adsorption particle-containing layer from the first electrode.

18. A method of manufacturing a display device, comprising:
a microcapsule-containing layer formation step of forming a microcapsule-containing layer including microcapsules each having an outer surface, the microcapsules each produced by encapsulating a plurality of electrically charged adsorption particles and a substantially transparent medium into a shell having an inner portion with an inner surface opposite from the outer surface; and
an electrode formation step of forming a pair of electrodes that, when applied with an electrical voltage, generate electrical fields to act on the adsorption particles,
wherein the microcapsule-containing layer formation step comprises a charging step of electrically charging the shell with an opposite polarity to the adsorption particles after forming the inner portion or the entirety of the shell, so that the adsorption particles are adsorbed to the inner surface of the shell and maintained in an adsorbed state at stoppage of application of the electrical voltage.

19. The method as claimed in claim 18, wherein the shell comprises a first layer corresponding to the inner portion and a second layer arranged outside the first layer, the first layer and the second layer each having a shell-like shape, and the charging step is performed when forming the second layer.

20. The method as claimed in claim 18, wherein in the microcapsule-containing layer formation step, the microcapsule-containing layer is formed using a microcapsule dispersion liquid prepared by mixing the microcapsules with a fixing material that makes close contact with the outer surface of each of the microcapsules to fix the microcapsules in place, and the charging step is performed when preparing the microcapsule dispersion liquid.

* * * * *